(12) United States Patent
Papadogianakis et al.

(10) Patent No.: US 8,263,794 B2
(45) Date of Patent: Sep. 11, 2012

(54) PROCESS FOR THE PARTIAL HYDROGENATION OF FATTY ACID ESTERS

(75) Inventors: Georgios Papadogianakis, Athens (GR); Achilleas Bouriazos, Peireas (GR); Konstandinos Mouratidis, Athens (GR); Nikolas Psaroudakis, Athens (GR)

(73) Assignee: Cognis IP Management GmbH, Duesseldorf (DE)

( * ) Notice: Subject to any disclaimer, the term of this patent is extended or adjusted under 35 U.S.C. 154(b) by 365 days.

(21) Appl. No.: 12/444,989

(22) PCT Filed: Oct. 2, 2007

(86) PCT No.: PCT/EP2007/008547
§ 371 (c)(1),
(2), (4) Date: Apr. 9, 2009

(87) PCT Pub. No.: WO2008/043454
PCT Pub. Date: Apr. 17, 2008

(65) Prior Publication Data
US 2010/0022664 A1 Jan. 28, 2010

(30) Foreign Application Priority Data

Oct. 11, 2006 (EP) .................................. 06021297

(51) Int. Cl.
*C07C 51/36* (2006.01)
(52) U.S. Cl. ........ 554/145; 554/141; 554/144; 554/124; 44/385

(58) Field of Classification Search ................. None
See application file for complete search history.

(56) References Cited

U.S. PATENT DOCUMENTS 5,354,877 A 10/1994 Behr et al.

FOREIGN PATENT DOCUMENTS

| DE | 4012873 | 10/1991 |
| DE | 4109246 | 9/1992 |
| GB | 1227144 | 4/1971 |
| GB | 1594603 | 8/1981 |
| WO | 2005/007602 | 1/2005 |

OTHER PUBLICATIONS

Andersson, C and Larsson, R.: Catalytic Hydrogenation of Soybean Oil with Rh(I) Dihydride Complexes As Catalysts. In: JAOCS Jan. 1981, p. 54-58 (XP-002426321).
Larpent, C., Dabard, R., and Patin, H.: Catalytic Hydrogenation of Olefins in Biphasic Water-Liquid System. In: Tetrahedron Letters, vol. 28, No. 22, pp. 2507-2510, 1987 (XP-0024216320).

(Continued)

*Primary Examiner* — Yate K Cutliff
(74) *Attorney, Agent, or Firm* — DiehlServilla LLC

(57) ABSTRACT

Disclosed is a process for the manufacture of unsaturated fatty acid alkyl esters or glycerides having a total content of C18:1 of about 30 to about 80 Mol-%, by partial hydrogenation of unsaturated fatty acid esters having a total content of (C18:2+C18:3) of at least 65 Mol-%, calculated on the total amount of C18 moieties in the ester, wherein the hydrogenation is conducted in an aqueous/organic two-phase system in the presence of a water-soluble catalyst consisting of a Group VIII, Group IX, or Group X metal and a hydrophilic ligand.

22 Claims, 5 Drawing Sheets

OTHER PUBLICATIONS

Ucciani, E.: Valorization of Fats and Oils by Hydrogenation and Related Reactions. In: M. Guisnet et al. (Editors), Heterogeneous Catalysis and Fine Chemicals 1988 Elsevier Science Publishers B.V., Amsterdam—Printed in the Netherlands. p. 33-44.

Falk, O. and Meyer-Pittroff, R.: The Effect of Fatty Acid Composition on Biodiesel Oxidative Stability. In: Eur. J. Lipid Sci. Technol. 106 (2004) p. 837-843.

Knothe, G.: Dependence of Biodiesel Fuel Properties on the Structure of Fatty Acid Alkyl Esters. In: Fuel Processing Technology 86 (2005) p. 1059-1070. Published by Elsevier B.V.

Larpent, C. and Dabard, R. and Patin, H.: Rhodium (I) Production during the Oxidation by Water of a Hydrosuluble Phosphine. In: Inorganic Chemistry, vol. 26, No. 17, 1987, p. 2922-2924.

Kotzabasakis, V. et al.: Catalytic conversions in Aqueous Media: A Novel and Efficient Hydrogenation of Polybutadiene-1,4-block-poly(ethylene oxide) Catalyzed by Rh/TPPTS Complexes in Mixed Micellar Nanoreactors. In: Journal of Molecular Catalysis A: Chemical 231 (2005) p. 93-101.

Van Den Berg, Jorrit D.J.: Effects of Traditional Processing Methods of Linseed Oil on the Composition of its Triacylglycerols. In: J. Sep. Sci. 2004, 27, p. 181-199.

Starks, Charles M.: Phase-Transfer Catalysis. I. Heterogeneous reactions Involving Anion Transfer by Quaternary Ammonium and Phosphonium Salts. In: Journal of the American Chemical Society 93.1, Jan. 13, 1971, p. 195-199.

Fell, Von B. and Schaefer, W.: Selektivhydrierung von Fettstoffen mit metallorganischen Mischkatalysatoren nach Ziegler-Sloan-Lapporte I: Selektive Hydrierung von Linolsauremethylester und Modelldienen mit isolierten Doppelbindungen. Fat. Sci. Technol. Nr. 7 1990 p. 264-272.

Fell, Von B. and Schaefer, W.: Selektivhydrierung von Fettstoffen mit metallorganischen Mischkatalysatoren nach Ziegler-Sloan-Lapporte IV: Isomerenverteilung wahrend der Hydrierung mehrfach ungesattigter Fettsauremethylester. Fat. Sci. technol. Nr. 9 1991. p. 329-335.

Fell, B., Schobben, C., & Papadogianakis, G.: Hydroformylierung homologer Alkencarbonsaureester mit wasserloslichen Rhodiumcarbonyl/tert. Phosphan-Komplexkatalysatorsystemen. Journal of Molecular Catalysis A: Chemical 101 (1995) p. 179-186.

Frankel: Lipid Oxidation, The Oily Press, Dundee, Scotland, 1998 (Full book—too large to upload).

Nohair, B. et al.: Palladium supported catalysts for the selective hydrogenation of sunflower oil. In: Journal of Molecular Catalysis A: Chemical 229 (2005) p. 117-126.

PROCESS FOR THE PARTIAL HYDROGENATION OF FATTY ACID ESTERS

CROSS REFERENCE TO RELATED APPLICATIONS

This application is the National Phase entry of PCT/EP2007/008547, filed Oct. 2, 2007, which claims priority to EPO patent application number EP 06021297.4, filed Oct. 11, 2006, both of which are incorporated herein by reference in their entireties.

FIELD OF THE INVENTION

The present invention relates to the area of oleochemicals and is more particularly related to an improved process for the biphasic selective hydrogenation of unsaturated fatty acid esters, the esters thus obtained and their use in the area of biofuels.

BACKGROUND OF THE INVENTION

Nowadays, renewable resources are considered to be the new challenge in the development of Sustainable/Green chemistry. Interest in the application of biomass has increased considerably during the last decade because biomass-based resources are renewable and $CO_2$ neutral. In addition, the projected long-term limitations on the exploitation of fossil feedstock, the recent increases in crude oil prices and environmental concerns regarding the local air pollution, the global warming problems caused by $CO_2$, the biodegradability and biocompatibility of many petrochemical based products have also played a role in this respect. Today the world production of renewable biomass is about $200 \cdot 10^9$ t/a of which $130 \cdot 10^6$ t/a are fats and oils and only 7% of the total biomass production capacity are used for food, feed and non-food applications. These figures compared to the world capacity of extracted fossil fuels which is only $7 \cdot 10^9$ t/a show the huge potential of renewable biomass for energy, chemicals and material production. According to the Directive 2003/30/EC of the European Parliament and of the Council by 31 Dec. 2010 biofuels shall be 5.75% of the transportation fuels and according to the US roadmap for biomass technologies—2020 vision goals, biofuels will meet 10% of the fuels, and biomass-based chemicals 18% of the chemicals in the US market.

Vegetable oils and their derivatives are important feedstocks for the industry with a broad spectrum of applications such as in foodstuff chemistry, pharmacy, cosmetics, plastics, detergents, biolubricants and in the energy field with the production of biodiesel mainly by trans-esterification reactions with methanol or ethanol to obtain fatty acid methyl (FAME) or ethyl esters (FAEE).

Catalytic hydrogenation of renewable vegetable oils and their derivatives constitutes a major unit operation in the chemical industry. Selective hydrogenation processes of alkyl esters of vegetable oils to transform multiple unsaturated fatty esters into a single unsaturated ester without increasing the saturated part are of greatest interest in the fields of biolubricants and biodiesel. The first aim of these processes is to improve oxidative stability because the relative rates of oxidation are 98 for methyl linolenate (MLN), 41 for methyl linoleate (ML) and 1 for methyl oleate (MO) [Knothe, Fuel Process. Technol. 86, p1059f (2005); Frankel, Lipid Oxidation, The Oily Press, Dundee, Scotland, 1998]. Nohair et al. [J. Mol. Catal. A: Chem. 229, p117f (2005)] and Ucciani [Stud. Surf. Sci. Catal. 41, p26f (1988)] have reported that the oxygen absorption rate in linolenic acid (C18:3; 9c, 12c, 15c), linoleic acid (C18:2; 9c, 12c) and oleic acid (C18:1, 9c) is 800/100/1, respectively. The bis-allylic positions in common polyunsaturated FAMEs such as MLN (two bis-allylic positions at C-11 and C-14) and ML (one bis-allylic position at C-11) are even more prone to autoxidation than allylic positions. Therefore, partial hydrogenation of polyunsaturated FAMEs to C18:1 substantially increases their oxidation stabilities and greatly improve the ageing/storage properties of biolubricants and biodiesel which makes the addition of synthetic antioxidants superfluous. Falk et al. [Eur. J. Lipid Sci. Technol. 106, p837f (2004)] partially hydrogenated polyunsaturated FAMEs and could increase the oxidation stability at a low pour point of the biodiesel product. The second one aim is to avoid deterioration in low-temperature behaviour such as on the pour point. To preserve fluidity it is mandatory not to increase the melting point of the mixture that depends on both the amount of saturated methyl stearate (MS), C18:0, (melting point of MS=+39.1° C.) and the extend of cis/trans and positional isomerization (e.g. the melting point of MO, (C18:1, 9c), is −19.9° C. and of methyl elaidate (ME), (C18:1, 9t), is +10.0° C. The third aim of the partial hydrogenation of polyunsaturated FAMEs is to increase the performance i.e. the cetane numbers of biodiesel. Knothe reported for ethyl linolenate a cetane number of 22.7, for ML: 38.2, for MO: 59.3 and for methyl stearate a cetane number of 86.9.

In hydrogenation processes of C=C units in unsaturated fatty acids of vegetable oils are commonly used heterogeneous catalytic systems based on nickel, palladium, copper, copper-chromite, platinum etc. However, for edible oil hydrogenation heterogeneous catalysts based on nickel has been the choice of industry. The aims of traditional selective hydrogenation of edible oils are to increase their melting temperature and thus increasing the consistency for use as margarine and to improve the oxidative stability while an important amount of the C=C units in the fatty acid chain is cis/trans-isomerized. In recent years the negative health effects of trans-fats received increasing attention and are considered to be even more detrimental than saturated fats. Both trans- and saturated fatty acids contained in margarine are strongly correlated with a higher concentration of plasma LDL-cholesterol. The decisions in Europe to limit or in USA to declare the trans-isomers contained in fatty foodstuffs caused a demand for hardstocks with lower trans-isomers content. Therefore, there is increasing interest in the development of new industrial hydrogenation processes producing lower amounts of trans- and saturated fats. One development involves the use of selective homogeneous transition metal complexes as catalysts to obtain mainly cis-C18:1 fats and these homogeneous catalysts should be easily and quantitatively recovered and recycled. Ideal homogeneous catalysts for such conversions would be water soluble transition metal complexes to act in aqueous/organic two phase systems. The other development involves the use of shape-selective zeolites that allow the rather straight trans-isomer to enter the pores while keeping the more curved cis-isomer outside.

According to DE 4109246 A1 the hydrogenation of polyunsaturated fatty acids and their derivatives can be conducted using $Na_2PdCl_4$ catalysts precursors in propylene carbonate and aqueous sodium carbonate solutions; the catalytic reaction was performed in a homogeneous system. After the reaction, n-hexane was added to the reaction mixture and a two-phase system was formed, allowing the catalyst recovery by a phase separation of the lower propylene carbonate phase. Instead of propylene carbonate could also be used a nitrogenous aprotic solvent as activator such as dimethyl formamide. Fell et al. [Fat Sci. Technol. 92, p264f (1990); ibid. 93, p329f (1991)] also homogeneously hydrogenated ML using Ziegler-Sloan-Lapporte catalysts based on Ni(acac)$_2$ or Pd(acac)$_2$ and Al(C$_2$H$_5$)$_3$ with a high selectivity (>90%) to C18:1 products. However, a shortcoming of this reaction is the cumbersome separation of the catalyst from reaction products and its quantitative recovery in active form as well as the large quantities of triethyl aluminium required i.e a molar ratio of Ni(acac)$_2$/Al(C$_2$H$_5$)$_3$=$^1$/$_{10}$.

The complex object of the present invention has therefore been to provide a process for the production of unsaturated fatty acid alkyl esters having a total content of C18:1 of about 30 to about 80 Mol-% and more particularly more than 50 Mol-% by partial hydrogenation of unsaturated fatty acid esters having a total content of (C18:2+C18:3) of at least 65 Mol-% and more particular more than 75 Mol-% which avoids the disadvantages of the state of the art cited above. In particular, such process should allow to transfer highly unsaturated fatty acid alkyl esters or glycerides based e.g. on linseed or sunflower oil into a high-oleic fatty acid alkyl ester or glyceride, exhibiting low contents of higher unsaturated and fully saturated acyl moieties in order to improve the quality of said esters or glycerides, particularly with respect of their oxidative stability and cetane number at a low pour point for the application as so-called "biodiesel", higher oxidative stability and low pour point for the application as "biolubricants" and improved oxidative stability and low contents of trans-fats and fully saturated compounds for the application of "edible oils hydrogenation". Another object of the invention has been to conduct the hydrogenation process under mild and environmental-friendly conditions, particularly under biphasic conditions in an aqueous medium and by using catalysts which exhibit a high turnover frequency (TOF) and high selectivity towards the cis-C18:1 compounds and are easy to separate from the reaction mixture and to be returned into the process without reduction of activity.

SUMMARY

The present invention is directed to a process for the manufacture of unsaturated fatty acid alkyl esters or glycerides having a total content of C18:1 of about 30 to about 80 Mol-% by partial hydrogenation of unsaturated fatty acid esters having a total content of (C18:2+C18:3) of at least 65 Mol-%—calculated on the total amount of C18 moieties in the ester—which is characterised in that the hydrogenation is conducted in an aqueous/organic two phase system in the presence of a water soluble catalyst consisting of a Group VIII, Group IX, or Group X metal and a hydrophilic.

DETAILED DESCRIPTION

Figure 1:
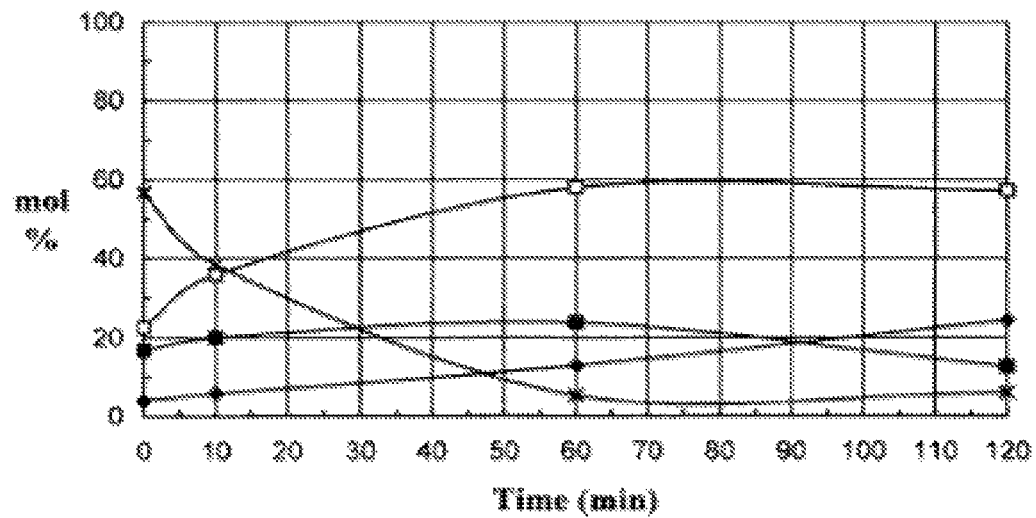
FIG. 1: Graph representing the effect of reaction time on micellar biphasic hydrogenation of MELD using RH/TPPTS catalysts.
Figure 2:
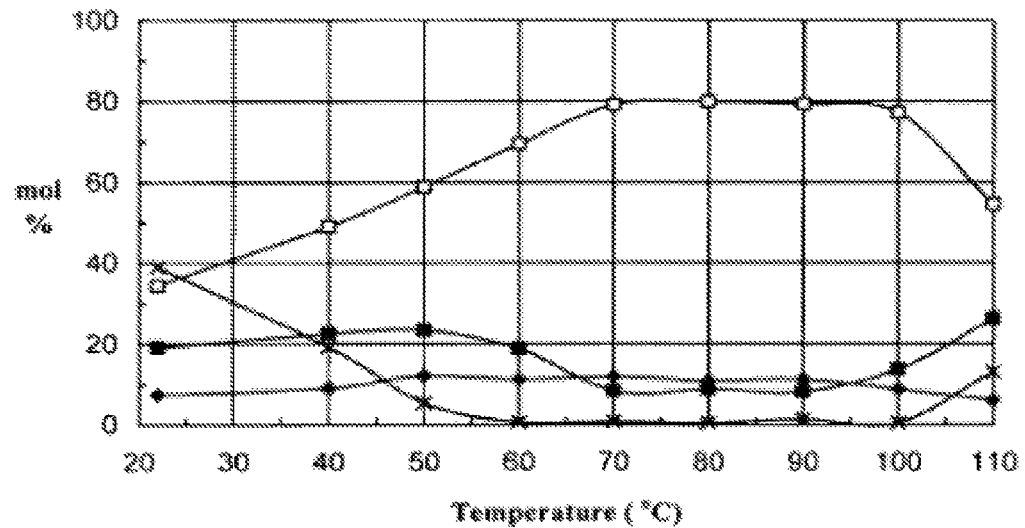
FIG. 2: Graph representing the effect of temperature on micellar biphasic hydrogenation of MELD using RH/TPPTS catalysts.
Figure 3:
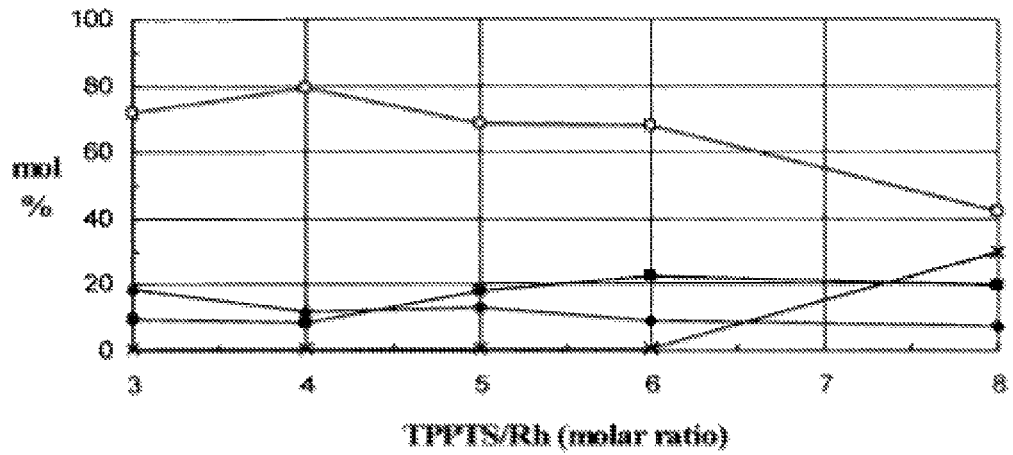
FIG. 3: Graph representing the effect of TPPTS/Rh molar ratio on micellar biphasic hydrogentation of MELD using Rh/TPPTS catalysts.
Figure 4:
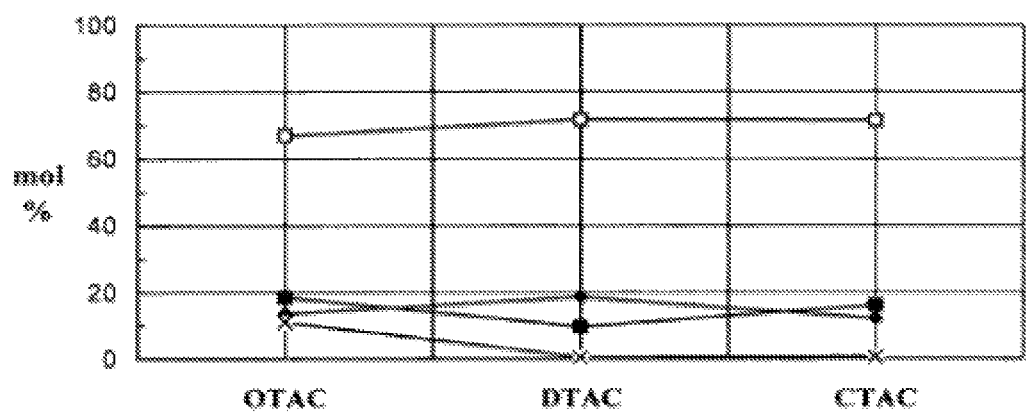
FIG. 4: Graph representing the effect of the addition of different cationic surfactants on micellar biphasic hydrogenation of MELD using Rh/TPPTS catalysts.
Figure 5:
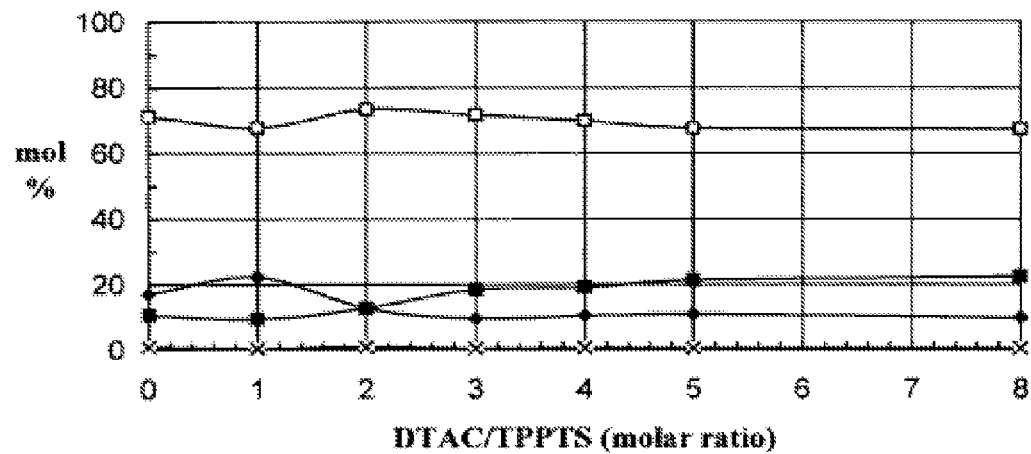
FIG. 5: Graph representing biphasic hydrogenation of MELD using Rh/TPPTS catalysts at different DTAC/TPPTS molar ratios.
Figure 6:
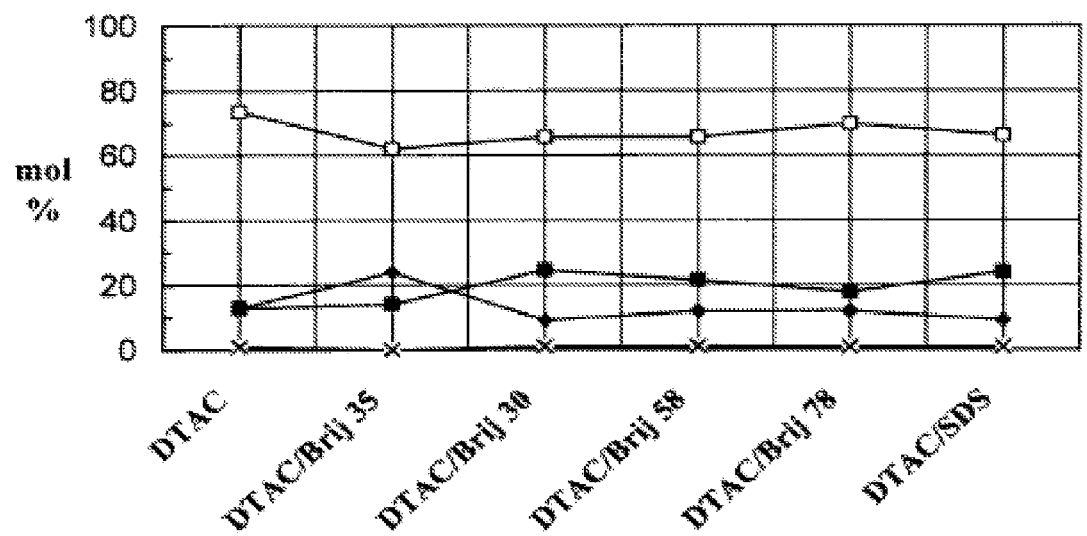
FIG. 6: Graph representing the effect of the addition of DTAC and mixtures of DTAC with various non-ionic and anionic surfactants on micellar biphasic hydrogenation of MELD using Rh/TPPTS catalysts.
Figure 7:
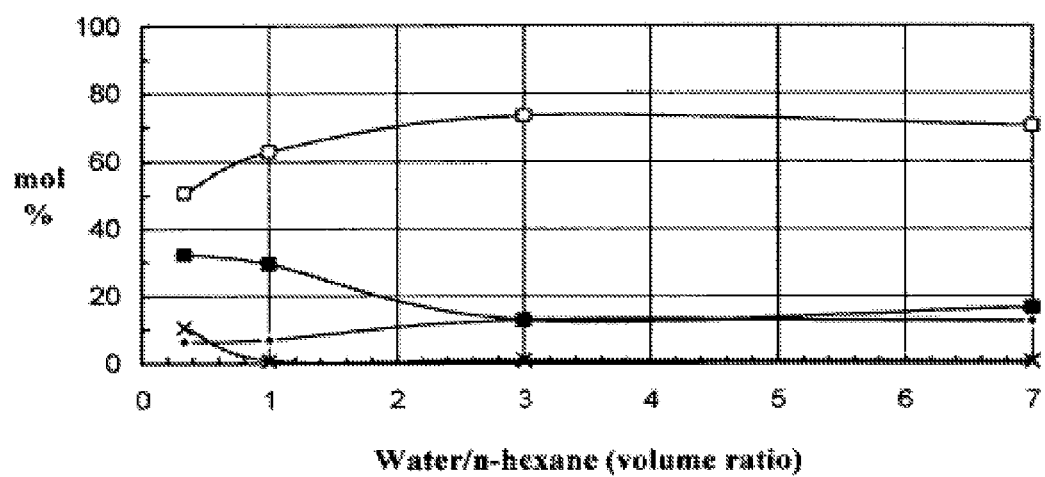
FIG. 7: Graph representing micellar biphasic hydrogentation of MELD using RH/TPPTS catalysts at different volume ratios of the aqueous to the organic solvent.

Surprisingly, it has been found that homogenous catalysts consisting of Group VIII, Group IX, or Group X metals and hydrophilic ligands allow the selective hydrogenation of polyunsaturated fatty acid alkyl esters or glycerides in an aqueous/organic two phase system with extremely high turnover frequency (TOF). The hydrogenation provides fatty acid alkyl esters or glycerides showing low contents of fully saturated acyl moieties, this means that a selective hydrogenation of linolenic and linoleic acid moieties to oleic (up to about 90%) with low content in elaidinic moieties (down to about 10% calculated on the total amount of C18:1) takes place. Beside this another advantage of the catalysts is seen in that they can be recycled from the reaction mixture by simple phase separation and transferred back into the hydrogenation without loss of activity.

Starting Material: Fatty Acid Alkyl Esters or Glycerides

The nature of the polyunsaturated starting material is only of little importance for the technical teaching of the present invention, but depends on the desired application. Typically fatty acid methyl or ethyl esters are used which are derived from natural sources like e.g. sunflower, rapeseed, soybeans, linseed, tobacco seed, sufflowers, cottonseed, crambles, palm, palm kernels, coconuts, olives, olive kernels, peanut kernels, hazelnut kernels, walnut kernels, almond kernels, sesame seed, castor beans, corn seed, wheat grain, fish, tall, tallow and lard. Typically, these esters exhibit a content of (C18:2+C18:3) acyl groups of more than 65, and preferably more than 75 Mol-%. The transformation of the glycerides, which are obtained as crude or refined oils directly from the plants, into the methyl or ethyl esters takes place by transesterification in known manners. Respective processes are very well known from the state of the art. For certain applications it is also possible to use the cited tri- or partialglycerides without any prior chemical transformation into the esters.

More particularly, suitable starting materials for the partial hydrogenation are those alkyl esters which are following general formula (I), $$R^1CO-OR^2 \qquad (I)$$

in which $R^1CO$ represents an acyl radical having 6 to 22, and more particularly 12 to 18 carbon atoms and 0, 1, 2 or 3 double bonds while $R^2$ stands for an alkyl group having 1 to 4 carbon atoms. In particular, the acyl radical comprises at least 60, preferably at least 70 Mol-% C18 residues. Calculated on the amount of C18 residues the content of (C18:2+C18:3)—which is considered to be the "polyunsaturated part" is more than 65 and about 70 to about 80 Mol-%. In a preferred embodiment of the present invention methyl or ethyl esters of line seed or sunflower fatty acid are used.

Catalysts

Currently there is growing interest in catalysis in aqueous media using water soluble transition metal complexes because of its broad range of potential applications. Water soluble catalysts in an aqueous/organic two phase system combine the advantages of homogeneous and heterogeneous catalysis:
(i) high activities and selectivities under mild reaction conditions by tailoring of the coordination sphere of the transition metal;
(ii) easy and quantitative recovery of the catalyst in active form from organic reaction products by simple phase separation.

Interest in aqueous systems has been further stimulated by increasing environmental constrains. Thus, aqueous/organic systems are environmentally attractive for the following reasons:
(i) numerous steps for the catalyst recovery in classical homogeneous catalytic processes are rendered superfluous and process engineering is enormously simplified, resulting in substantial energy savings and lower emissions;
(ii) they obviate the need for toxic organic solvents and water is a non-toxic, non-inflammable, safe, inexpensive, widely available and environmentally friendly, "green", solvent.

Presently, there are four industrial processes employing water soluble transition metal complexes as catalysts:
(i) the Ruhrchemie/Rhône-Poulenc process for the hydroformylation of lower olefins such as propene and butenes catalysed by Rh/TPPTS complexes in aqueous/organic two phase systems with a capacity of 800000 t/a;
(ii) the Rhône-Poulenc process for the synthesis of vitamin E and A intermediates using rhodium catalysts modified with TPPTS in a two phase system;
(iii) the Kuraray process for the synthesis of 1.9-nonanediol and n-octanol using palladium and rhodium catalysts with the sodium salt of monosulfonated triphenyl-phosphine (TPPMS) in a two phase system; and finally
(iv) the Union Carbide pilot plant process for the hydroformylation of higher olefins in a one-phase system with biphasic separation of the Rh/TPPMS catalyst.

In conjunction with the catalyst, it has been proven advantageous if the water soluble metal complexes are compounds whose central atom is a Group VIII, Group IX, or Group X metal, in particular rhodium, ruthenium, palladium, cobalt, platinum, nickel, iridium, iron, and preferably rhodium, ruthenium and palladium.

The water soluble metal complex preferably contains hydrophilic ligands, especially hydrophilic phosphines, amines and oxygen containing ligands, preferably sulfonated monophosphines and sulfonated chelating phosphines. Suitable hydrophilic ligands (numbered 1-224) are given in the following:

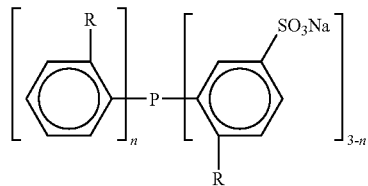

1 (TPPTS) n = 0
2 (TPPDS) n = 1
3 (TPPMS) n = 2

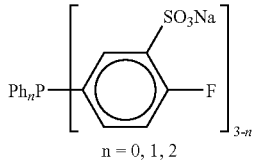

4 n = 0, 1, 2

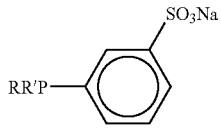

5

R = Me, Et; n = 0, 1, 2
R = OCH₃; n = 0

6

R = Me, R' = Ar
R = Me, R' = Et
R = Me, R' = Ph

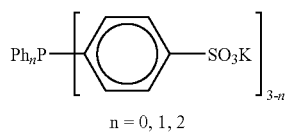

7 n = 0, 1, 2

8

R = Ph, R' = Me; R = R' = 3-Py
R = 2,4,6-Me₃C₆H₂, R' = CH₂Ph
R = 2,4,6-iPr₃C₆H₂, R' = Me, Ph

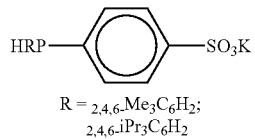

9

R = 2,4,6-Me₃C₆H₂;
2,4,6-iPr₃C₆H₂

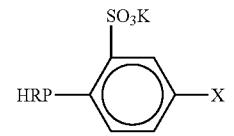

10

R = Ph; X = H
R = Ph; X = SO₃K
R = 2,4,6-Me₃C₆H₂; X = SO₃K

-continued
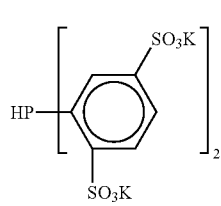
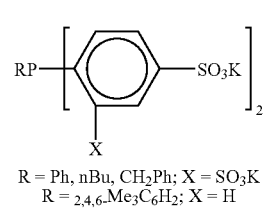
R = Ph, nBu, CH₂Ph; X = SO₃K
R = 2,4,6-Me₃C₆H₂; X = H
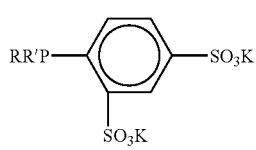
R = R' = Ph; R = Ph, R' = Me
R = Ph, R' = CH₂Ph; R = Ph; R' = C₁₂H₂₅
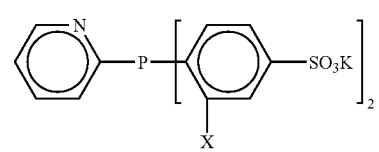
X = H, SO₃K
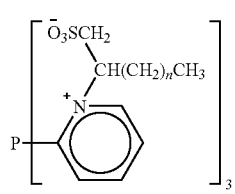
n = 0, 3, 5, 7, 9, 11
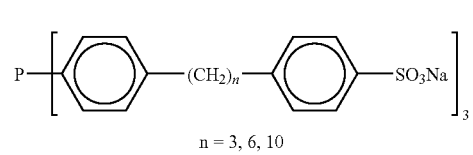
n = 3, 6, 10
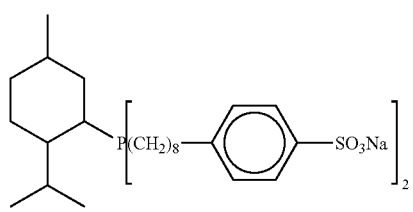
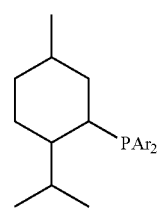
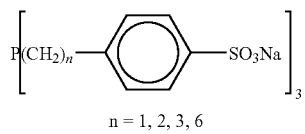
n = 1, 2, 3, 6
R₂P(CH₂)ₙSO₃Na
R = Ph; n = 2, 3, 4
R = Menthyl; n = 2, 3, 4
R = Cyclohexyl; n = 2
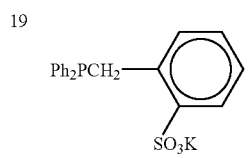
PhP[(CH₂)₄SO₃Na]₂
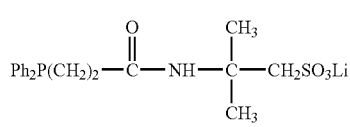
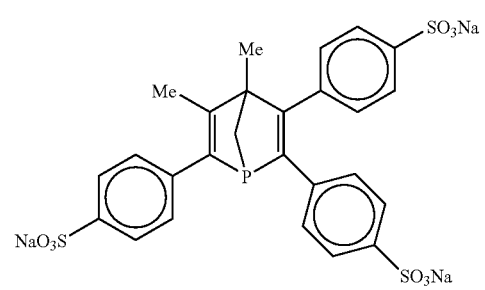

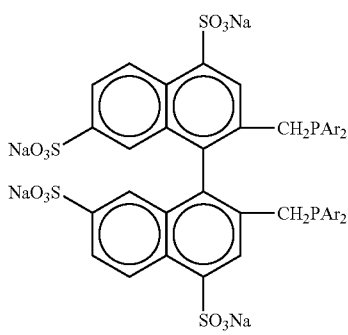
9
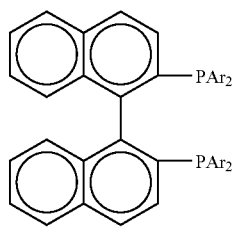
25
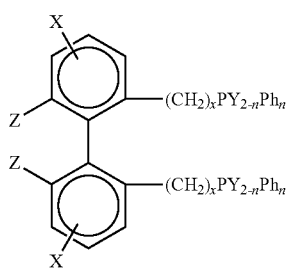
X = SO₃Na, Z = H, Y = Ar, x = 1, n = 0, 1
X = H, Z = OMe, Y = C₆H₄-p-SO₃Na, x = 0, n = 0
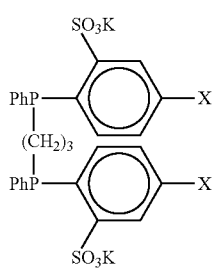
27
X = SO₃K, H
26
28
Ph$_m$Ar$_{2-m}$P(CH$_2$)$_x$PPh$_n$Ar$_{2-n}$
  x = 2, 3, 4
  m = 0, n = 0; m = 0, n = 1
  m = 1, n = 1; m = 1, n = 2
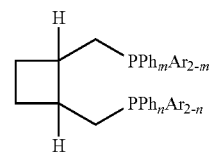
29
m = 0, n = 0; m = 0, n = 1
m = 1, n = 1; m = 1, n = 2
m = 1, n = 1; Ar = nBuSO₃Li
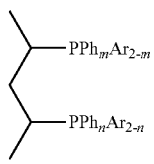
m = 0, n = 0; m = 0, n = 1
m = 1, n = 1; m = 1, n = 2
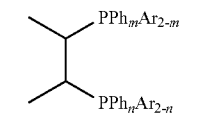
31
m = 0, n = 0; m = 0, n = 1
m = 1, n = 1; m = 1, n = 2
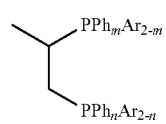
m = 0, n = 0; m = 0, n = 1
m = 1, n = 1; m = 1, n = 2
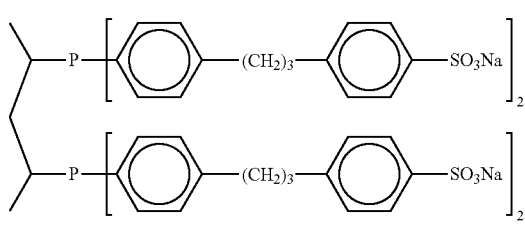
33
34
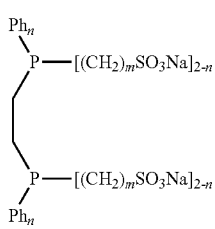
m = 3, 4; n = 1
m = 3; n = 0
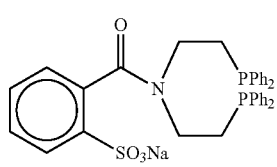
35
36

-continued
37
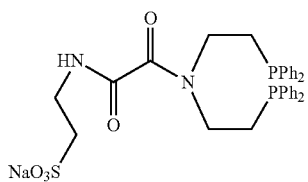
38
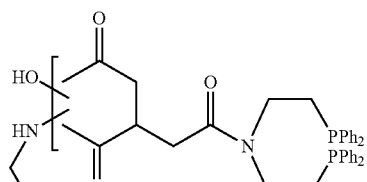
39
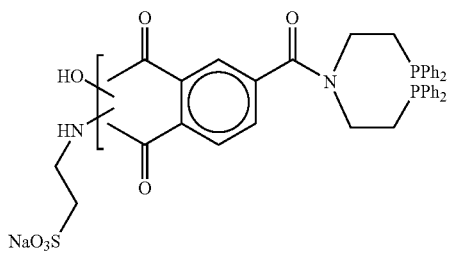
40
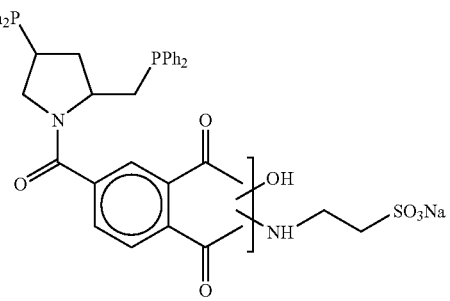
41
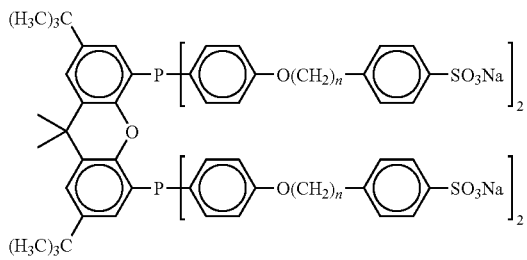
n = 0, 3, 6
42
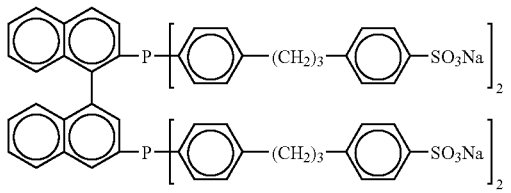
n = 3, 10
43
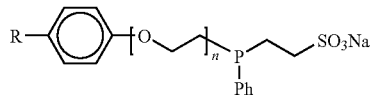
44: R = 2, 2, 4, 4-tetramethylbutyl; n = 1.4, 5.1, 11.2
45: R = n-nonyl; n = 1.6, 5.6, 11.4
46
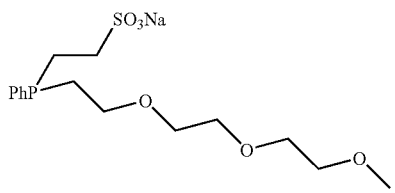
47
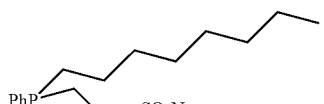
48
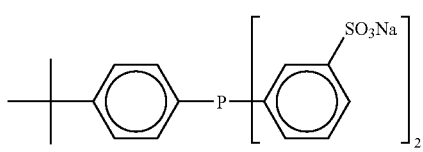
49
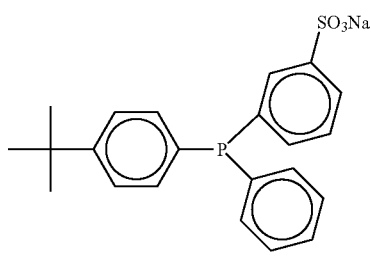
50
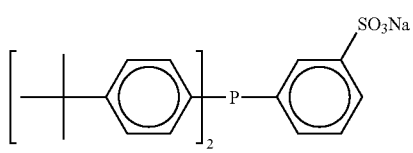
51
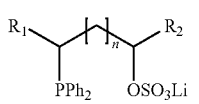
n = 0, 1, 2; R₁ = H, Me; R₂ = H, Me -continued
| 52 | 53 |
|---|---|
| 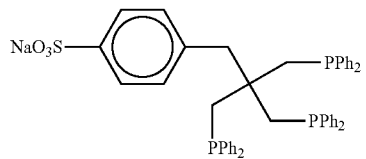 | 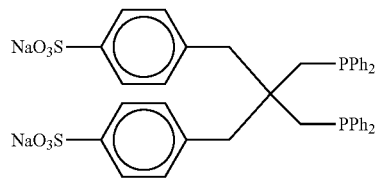 |
| 54 | 55 |
|---|---|
| 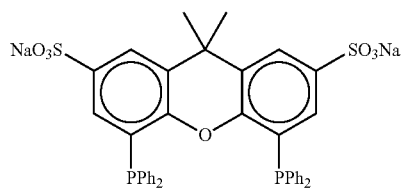 | 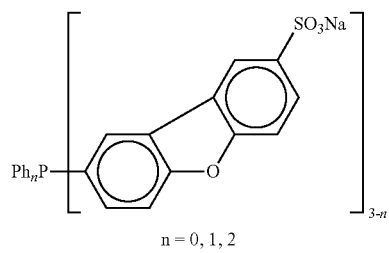<br>n = 0, 1, 2 |
| 56 | 57 |
|---|---|
| 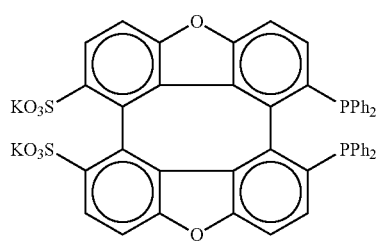 | 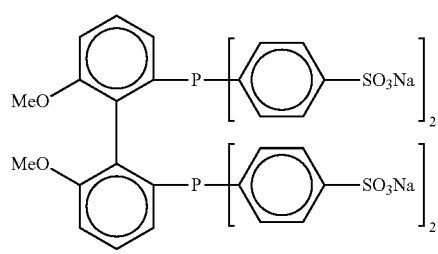 |
| 58 | 59 |
|---|---|
| 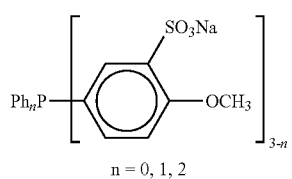<br>n = 0, 1, 2 | 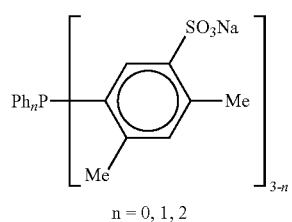<br>n = 0, 1, 2 |
| 60 | 61 |
|---|---|
| 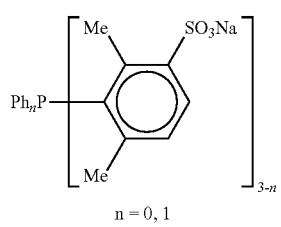<br>n = 0, 1 | 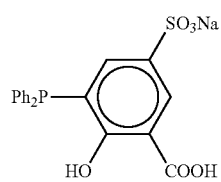 |
| 62[c] | 63[d] |
|---|---|
| 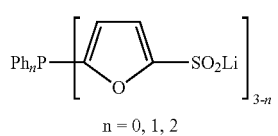<br>n = 0, 1, 2 | 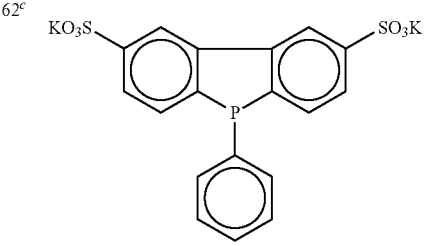 |
| 64 | 65 |
|---|---|
| 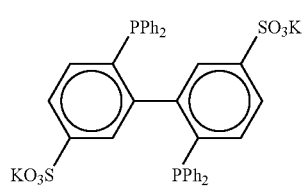 | 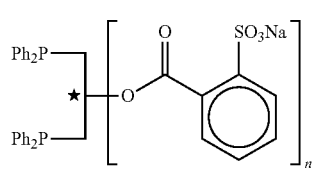 |

-continued
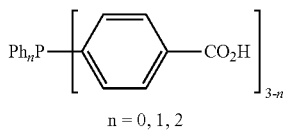
n = 0, 1, 2
65
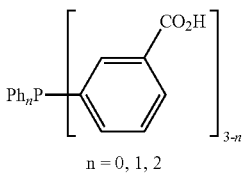
n = 0, 1, 2
66
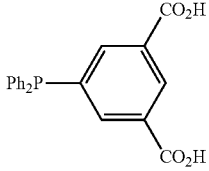
67
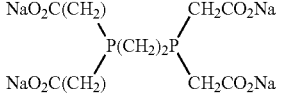
68
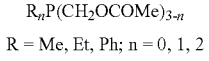
69
Ph₂P(CH₂)ₙCOOH
n = 1, 2, 3, 4, 5, 7, 9, 11
70
NaO₂C(CH₂)  CH₂CO₂Na
        P(CH₂)₂P
NaO₂C(CH₂)  CH₂CO₂Na
71
RₙP[(CH₂)ₓCOOR']₃₋ₙ
R = Me, Et, Ph; R' = H, Na, Me
n = 0, 1; x = 1, 2
72
RₙP(CH₂OCOMe)₃₋ₙ
R = Me, Et, Ph; n = 0, 1, 2
73
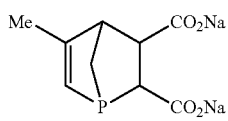
74
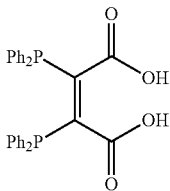
75
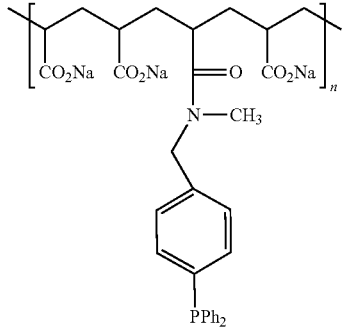
76
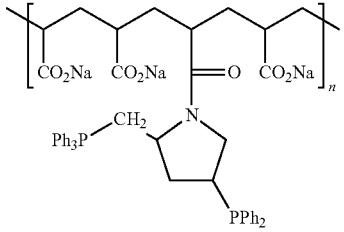
77
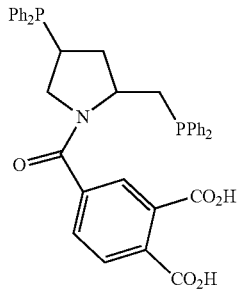
78
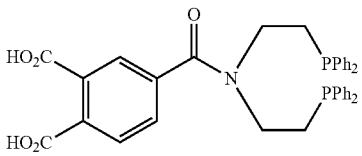
79
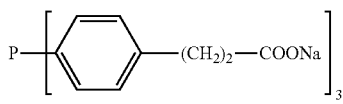
83

-continued
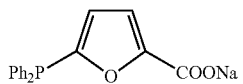
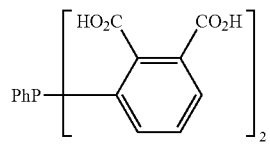
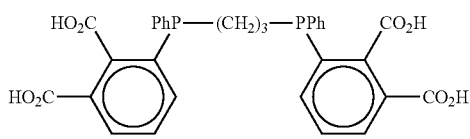
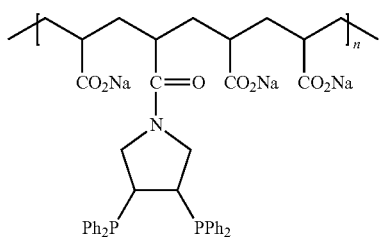
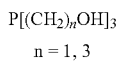
P[(CH₂)ₙOH]₃
n = 1, 3
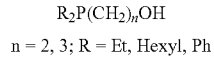
R₂P(CH₂)ₙOH
n = 2, 3; R = Et, Hexyl, Ph
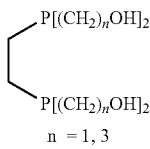
P[(CH₂)ₙOH]₂
P[(CH₂)ₙOH]₂
n = 1, 3
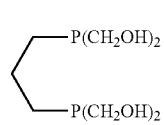
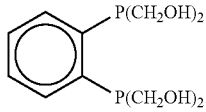
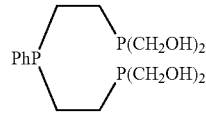
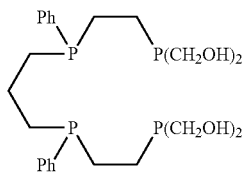
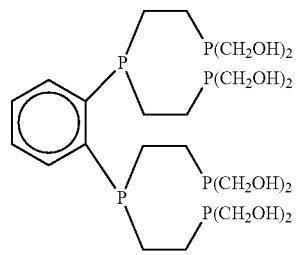
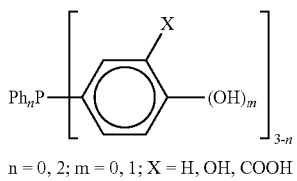
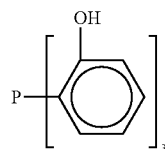
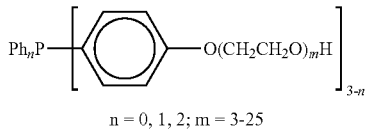
n = 0, 2; m = 0, 1; X = H, OH, COOH
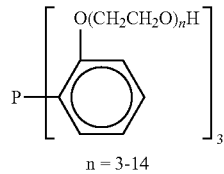
n = 0, 1, 2; m = 3-25
n = 3-14

-continued

102: Ph₂P–N(C(=O)–CH₂(CH₂CH₂O)ₙ₋₁(CHCH₃O)ₘ(CH₂CH₂O)ₙ₋₁CH₂–C(=O))–N–PPh₂ (piperazine-type)
n = 11; m = 34

103: Ph₂P(CH₂CH₂O)ₙ₋₁CH₂CH₂PPh₂
n = ca. 2000

104: CH₃(OCH₂CH₂)ₙOCH₂CH< dioxolane with two CH₂PPh₂ groups
n = (5), 16, 42

105: CH₃(OCH₂CH₂)ₙOCH₂CH(PPh₂)CH₂PPh₂
n = 5, 18

106: PhₙP[(CH₂)₃O(CH₂CH₂O)ₘR]₃₋ₙ
n = 0, 1, 2; m = 1, 2, 3; R = H, Me

107: PhₙP[(CH₂)₃OCH₂CH(OH)CH₂OH]₃₋ₙ
n = 1, 2

108: PhₙP[(CH₂)₃O sugar]₃₋ₙ
n = 1, 2
Sugar = glucose, fructose etc.

109: Glucopyranose with 2-OPh, 3-OPPh₂, 4-PPh₂, 6-OH, HO- substituents

110: PhₙP[(CH₂)ₓ(CH₂CH₂O)ₘR]₃₋ₙ
n = 0, 1; x = 0, 1; m = 1, 2, 3; R = Me, Bu

111: P[CH(CH₃)(CH₂CH₂O)ₙCH₃]₃
n = 1, 2, 3

112: PhP[CH₂(CH₂CH₂O)ₙCH₃]₂
n = 1, 2

113: Ph₂P–[C₆H₄–CH₂O(CH₂CH₂O)ₙCH₃]ₓ
x = 0, 1; n = 12, 16

114: Ph₂P-substituted benzo-crown ether, n = 1, 2, 3, 4

115: Ph₂PCH₂–N in aza-crown ether (with four O)

116: H₃C(OCH₂CH₂)ₙO–C(=O)–N(piperazine)–PPh₂ (×2)
n = 12, 16, 110

117: R–C₆H₄–[O–CH₂CH₂]ₙ–PPh₂
118: R = 2,2,4,4-tetramethylbutyl; n = 1, 2, 5, 12, 13
119: R = n-nonyl; n = 1.4, 2, 5, 11, 12, (unnumbered): HO-substituted cyclic imide with –CH₂C(=O)–N(piperazine)(PPh₂)₂ and –NHCO(CHOH)₄CH₂OH side chain -continued
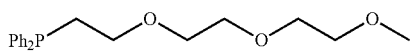
120
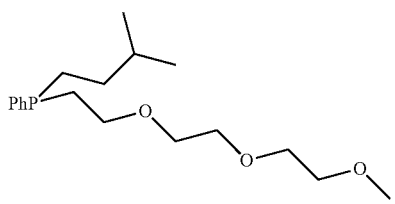
121
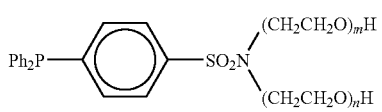
122
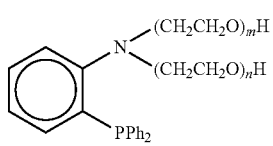
m + n = 35, 45
123
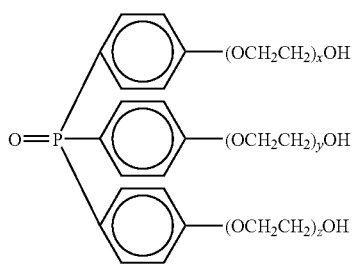
m + n = 17, 25, 34
124
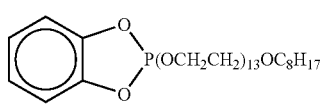
125[b]
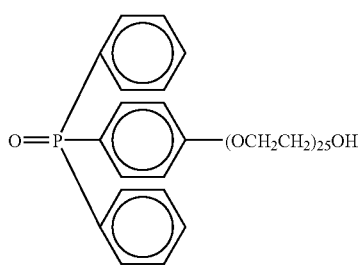
x + y + z = N
N = 20, 22, 30, 45
126
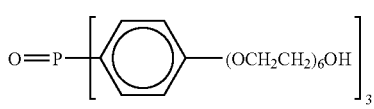
127
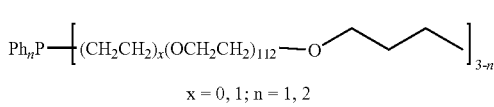
x = 0, 1; n = 1, 2
128
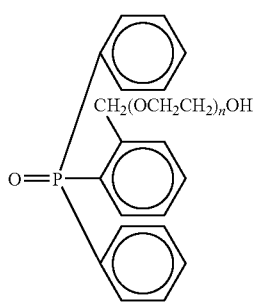
n = 18, 25
129
130
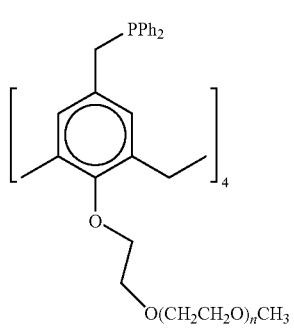
131

-continued
132
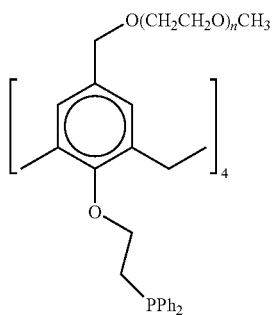
133
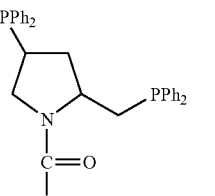
n = 4, 10, 16, 23; m = 1, 12
134
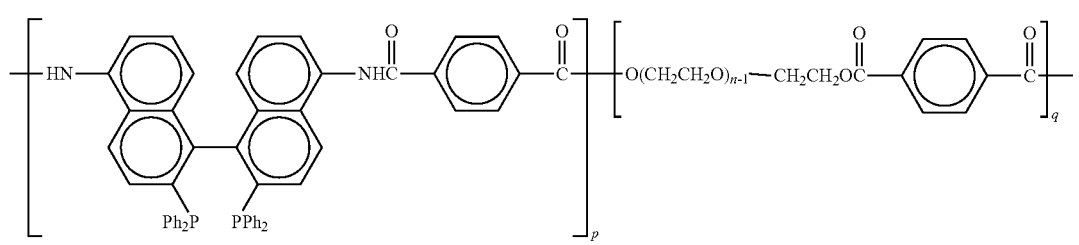
135
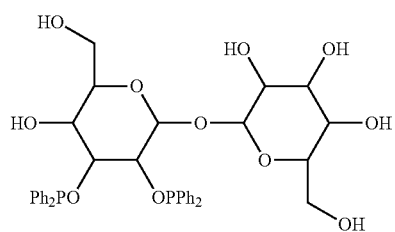
136
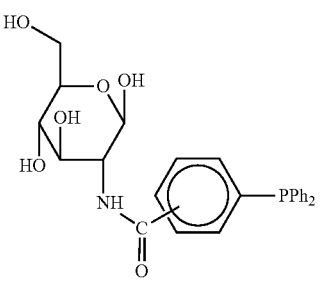
137
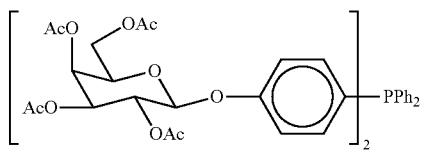
137a
138
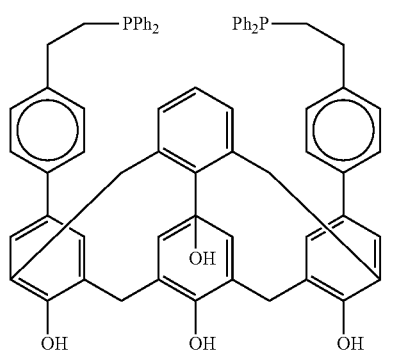
139
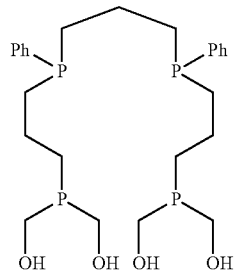
R = (CH₂)ₙOH, n = 1-8
R = (CH₂)ₙCH(CH₂OH)₂, n = 3-6
140
141
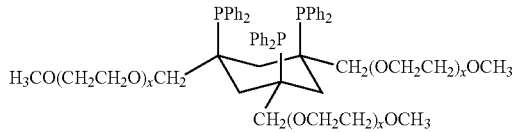

-continued

| | | | |
|---|---|---|---|
| | 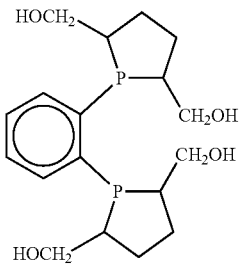 | 142 | 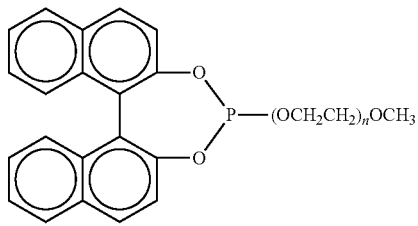 143[b] |
| | [R₂P(CHR′)ₙNMe₂R″]⁺<br>R = Ph, Cy; R′ = H, Me;<br>n = 2, 3; R″ = H, Me, iPr | | n = 16-17 |
| | P[(CH₂)₂NMe₂R]⁺₃3X⁻<br>R = H, Me | 144 | P[(CH₂)ₙNR₂]₃<br>n = 2, 3; R = Me, Et | 145 |
| | [R₂P(CH₂)₂NMe₂R′]⁺<br>R = R′ = Me, Octyl, Dodecyl | 146 | [(HOCH₂)₂P(CH₂)₂NMe₃]⁺ | 147 |
| | [Me₂P(CH₂)₂NMe₂R]⁺<br>R = Octyl, Dodecyl | 148 | [H₂P(CH₂)ₙNR₂R′]⁺<br>n = 2, 3, 6, 7, 8, 12<br>R = R′ = Me, Et, Butyl | 149 |
| | CyₙP[(CH₂)₂N⁺Me₃]₃₋ₙ<br>n = 1, 2; Cy = Cyclohexyl | 150 | {H₂N[(CH₂)₂PPh₂]}⁺ | 151 |
| | 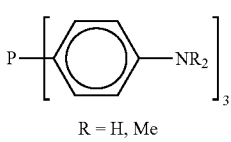 | 152 | PhₙP[(CH₂)₃NHC⁺(NH₂)₂]₃₋ₙ<br>n = 1, 2 | 153 |
| | R = H, Me | 154 | 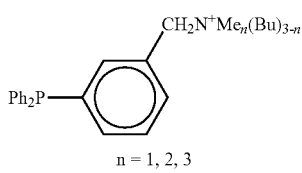<br>n = 1, 2, 3 | 155 |
| | 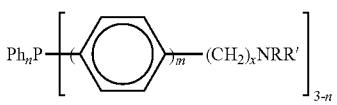<br>n = 1, 2; m = 0, 1; x = 1, 2; R = Me, Et, Ph<br>R′ = Me, Et, Ph | 156 | 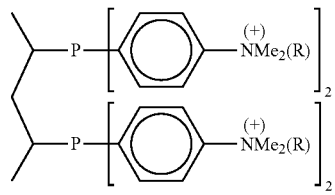<br>R = H, Me | 157 |
| | 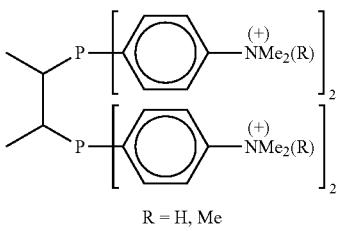<br>R = H, Me | | | 158 |
| | 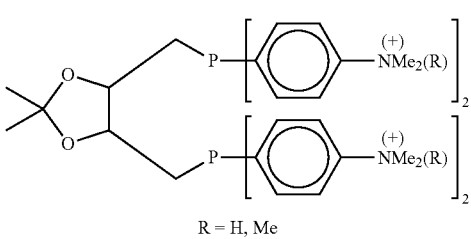<br>R = H, Me | 159 | 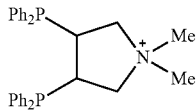 | 160 |

-continued
161 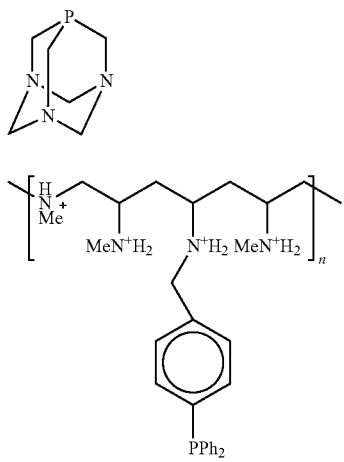
162 
163 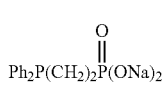
164 
[Ph₂P(CH₂)ₙPMe₃]⁺
n = 2, 3, 6, 10
165 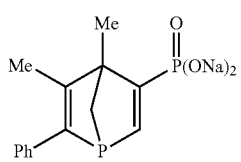
166 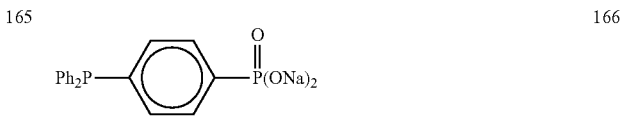
167 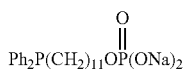
168 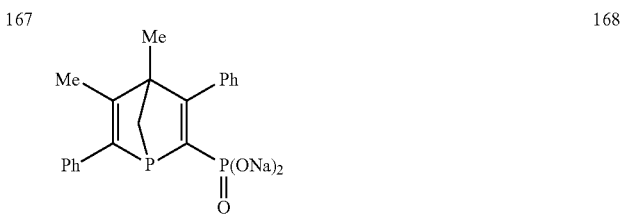
169 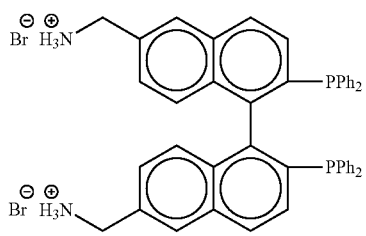
170 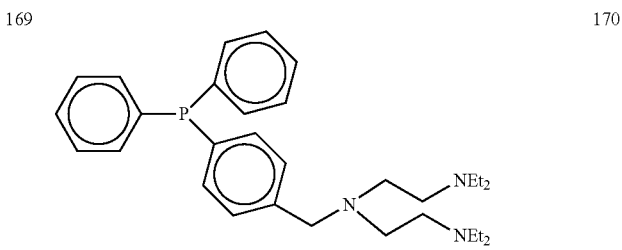
171 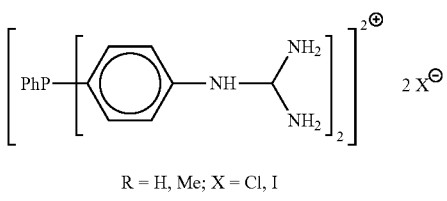
172 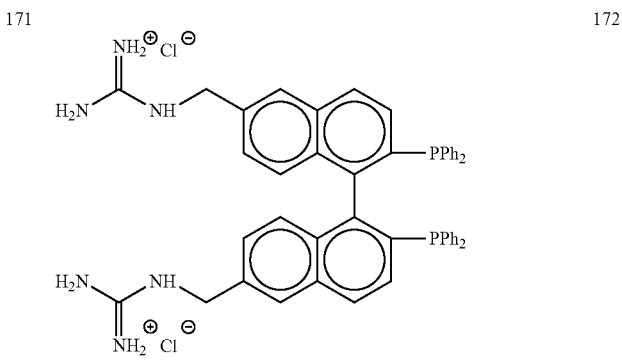
173 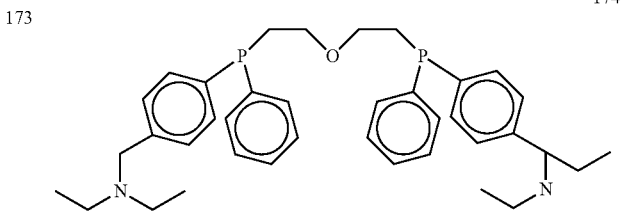
174

-continued
174
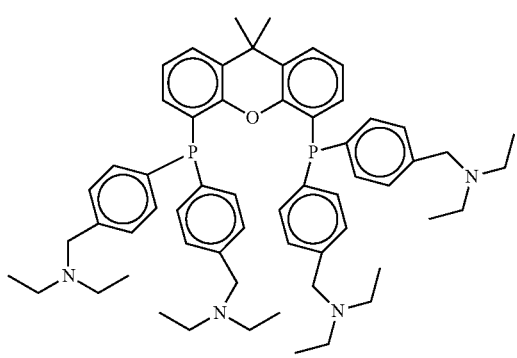
175
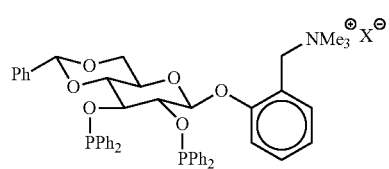
176
177
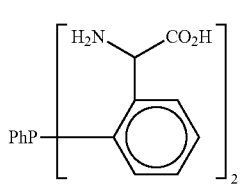
178
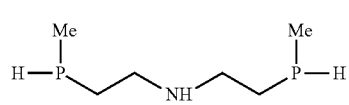
179
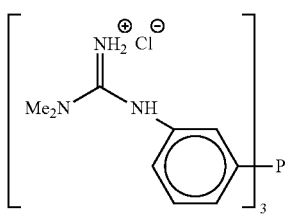
180
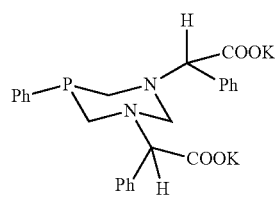
181
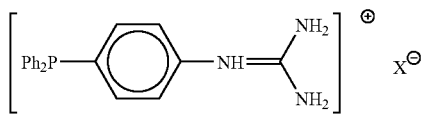
182
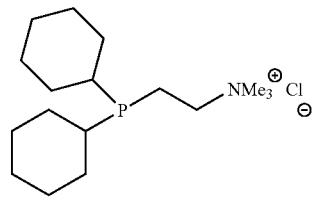
183
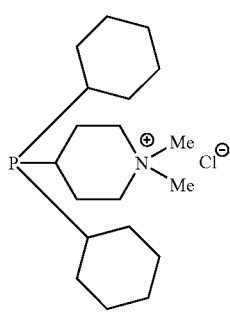
184
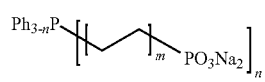
n = 1, 2; m = 1, 3, 5, 6
185
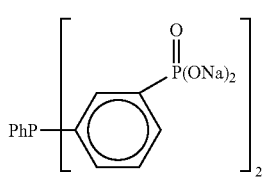
186
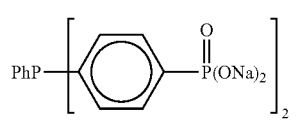
187
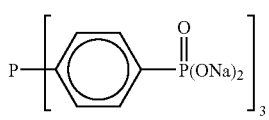
188
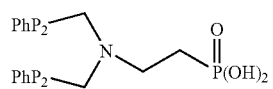

-continued
| | |
|---|---|
| 189 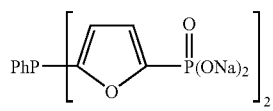 | 190 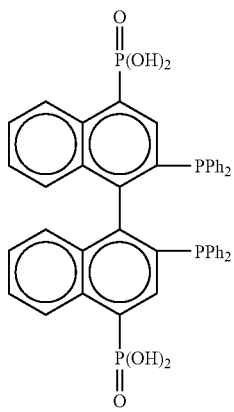 |
| 191 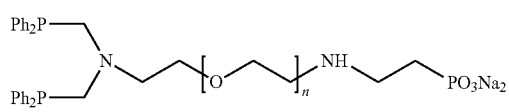 | 192 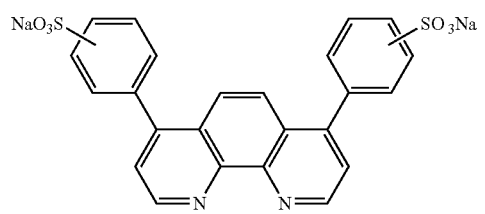 |
| 193 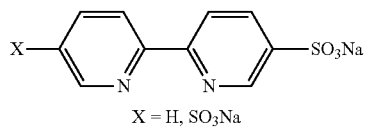<br>X = H, SO₃Na | 194 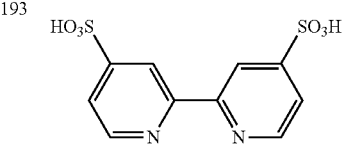 |
| 195 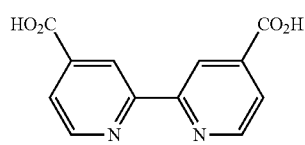 | 196 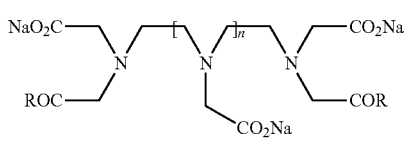<br>n = 0, 1, 2<br>R = ONa, NHCH₃, NH(CH₂)₂CH₃ |
| 197 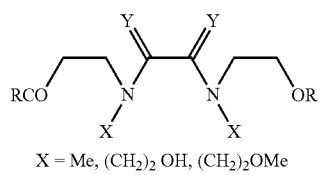<br>X = Me, (CH₂)₂OH, (CH₂)₂OMe<br>Y = H, O; R = H, Me | 198 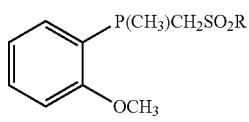<br>R = Me, NMe |
| 199 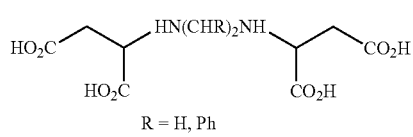<br>R = H, Ph | 200 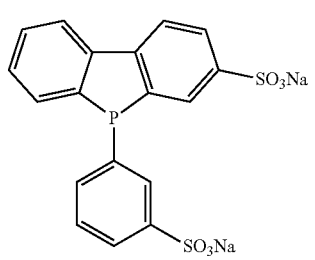 |

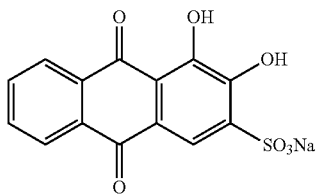
201
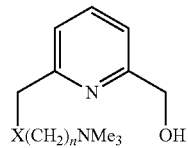
202
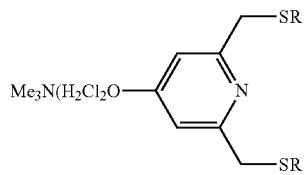
203
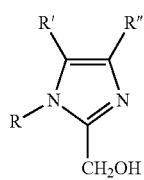
204
R = C$_{10}$H$_{32}$CH(OSO$_3$Na)CH$_2$, C$_{12}$H$_{25}$
R' = H, CH$_2$OH; R'' = CH$_2$S(CH$_2$)$_2$SO$_3$Na
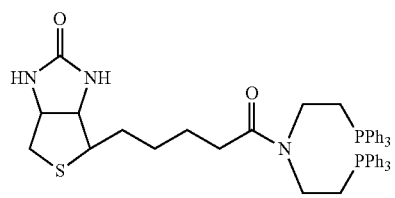
205
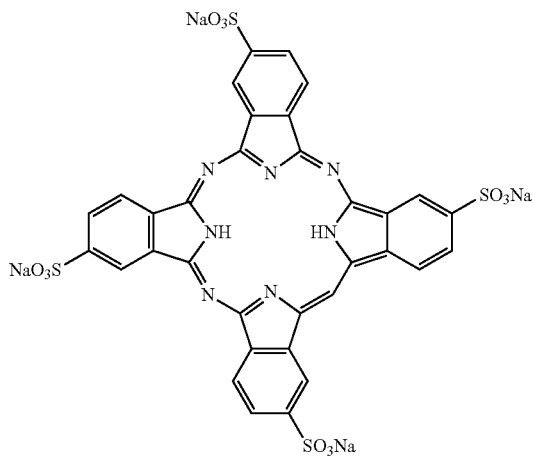
206
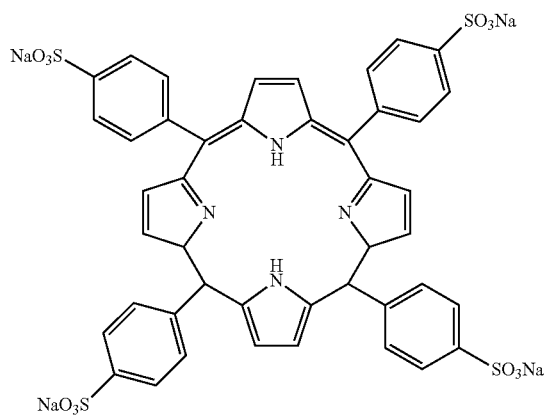
207
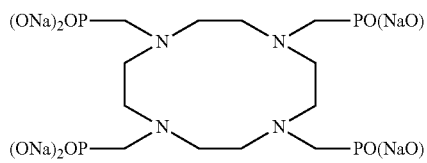
208
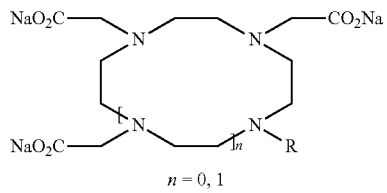
209
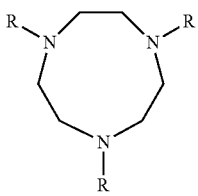
210
n = 0, 1
R = CH$_2$CO$_2$Na, CH$_2$CH(OH)CH$_3$
R = CH$_2$(CH$_2$)$_2$OH, (CH$_2$)$_2$CO$_2$H

| | | | |
|---|---|---|---|
| 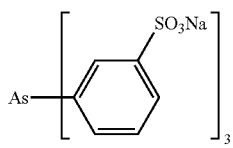 | 211 | Ph$_n$P[(CH$_2$)$_2$SCH$_2$R]$_{3-n}$<br>n = 0, 1, 2<br>R = CH$_2$SO$_3$Na, (CH$_2$)$_2$SO$_3$Na,<br>CH$_2$NH$_2$CH(NH$_2$)CO$_2$Et | 212 |
| Ph$_2$PCH=CHS(CH$_2$)$_2$SO$_3$Na | 213 | Ph$_2$PCH$_2$CH[S(CH$_2$)$_3$SO$_3$Na]$_2$ | 214 |
| 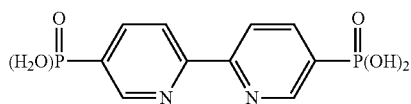 | 215 | | |
| 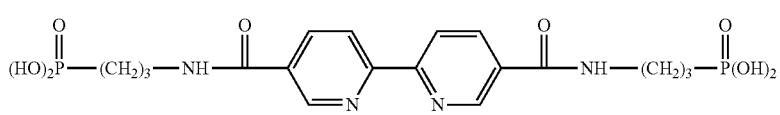 | 216 | | |
| 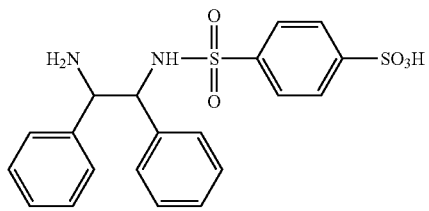 | 217 | 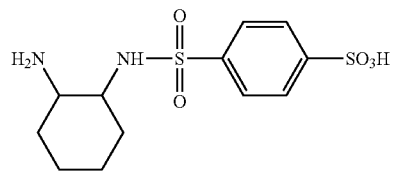 | 218 |
| 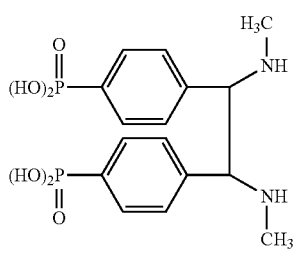 | 219 | 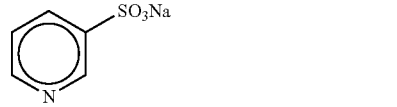 | 220 |
| H$_2$N-CH$_2$CH$_2$-SO$_3$Na | 221 | 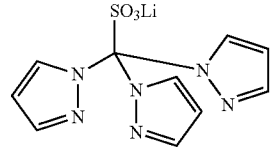 | 222 |
| 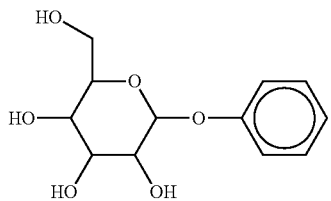 | 223 | 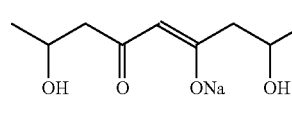 | 224 |

In a preferred embodiment of the present invention rhodium and/or ruthenium and/or palladium complexes have shown the highest activity and selectivity when combined with ligands of the trisulfonated triphenylphosphine (TPPTS) type. The catalyst is obtainable for example by simply mixing a watersoluble metal salt with the ligand, e.g. by preparing an aqueous solution of Rhodiumchloride or Rutheniumchloride or Palladiumchloride with TPPTS. In the following further details and preferred embodiments concerning the catalyst are given:

(i) molar ratio between Group VIII, Group IX, or Group X metal and hydrophilic ligand: about 1:1 to about 1:6, preferably about 1:2 to about 1:4;

(ii) content of Group VIII, Group IX, or Group X metal in the hydrogenation mixture:
about 10 to about 50, preferably about 15 to about 35 ppm;

(iii) molar ratio C=C/Group VIII, Group IX, or Group X metal: about 500 to about 25,000, preferably about 100 to about 20,000 and more preferably about 5,000 to about 15,000.

The catalysts according to the present invention exhibit turnover frequencies in the range of about 120,000 h$^{-1}$. The catalytic behavior of the water soluble Wilkinson's catalyst, RhCl(TPPTS)$_3$, prepared separately, is comparable with the catalytic activity obtained by Rh/TPPTS complexes formed in situ from RhCl$_3$.3H$_2$O with TPPTS and H$_2$ in the hydrogenation of FAMEs under the same conditions in aqueous/organic two phase systems. Recently one of us [J. Mol. Catal. A: Chem. 231, p93f (2005)] provided further experimental evidence that in hydrogenation reactions in aqueous media the RhCl(TPPTS)$_3$ catalyst exhibited similar behavior with Rh/TPPTS complexes generated in situ from RhCl$_3$.3H$_2$O with TPPTS and H$_2$ under the reaction conditions. Larpent et al. [Inorg. Chem. 26, p2922f (1987)] have reported the formation of RhCl(TPPTS)$_3$ from RhCl$_3$.3H$_2$O with TPPTS in the absence of H$_2$, where TPPTS acts both as a ligand and reducing agent to rhodium(III) chloride to afford RhCl(TPPTS)$_3$.

Co-catalysts: Cationic, Zwitterionic (Amphoteric), Nonionic and Anionic Surfactants, Ionic Liquids and Phase Transfer Catalysts It has been found that the presence of cationic, zwitterionic (amphoteric), nonionic and anionic surfactants, ionic liquids (IL) and/or phase transfer catalysts (PTC) improves activity and selectivity of the catalyst and facilitates the separation of the complexes after the hydrogenation has taken place. Typical examples for suitable cationic surfactants are the so-called tetraalkylammonium salts, which preferably follow general formula (II):

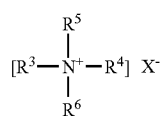

(II)

in which R$^3$, R$^4$, R$^5$ and R$^6$ independently from each other represent linear or branched, saturated or unsaturated aliphatic or hydroxyaliphatic radicals having 1 to 22 carbon atoms and X stands for chloride or bromide. Preferably at least two of these aliphatic radicals represent methyl groups, while at least one radical is a longer alkyl group having 8 to 18 carbon atoms. Typical examples are octyltrimethylammonium chloride (OTAC), dodecyltrimethylammonium chloride (DTAC), tetradecyltrimethylammonium chloride, cetyltrimethylammonium chloride (CTAC), cetylpyridinium chloride, octadecyltrimethylammonium chloride, distearyldimethylammonium chloride (DSDMAC). Other cationic surfactants of tetraalkylammonium salts include: tetrapentylammonium chloride, tetrahexylammonium chloride, tetradecylammonium chloride.

In the alternative, also cationic surfactants of the so-called esterquat type are useful, which can be derived from diethanol methylamine (DMA) and especially triethanol amine (TMA). The latter are preferably following general formula (III)

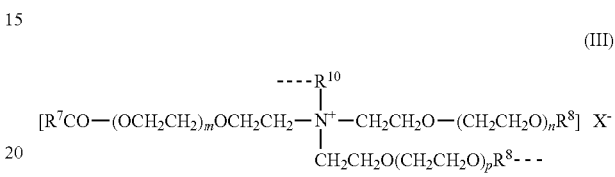

in which R$^7$CO represents an acyl radical having 6 to 22, preferably 12 to 18 carbon atoms, R$^2$ and R$^3$ independently stand for hydrogen or R$^7$CO, RIO means an alkyl radical having 1 to 4 carbon atoms or a (CH$_2$CH$_2$O)$_q$H-group, m, n and p represent in total 0 or an integer of 1 to 12, q represents numbers from 1 to 12 and X means halogenide, alkylsulfate or alkylphosphate. Typical and preferred examples are dicocoylmethylethoxymonium chloride and distearylmethylethoxymonium chloride which are sold under the trademark Dehyquart® L80 or AU56 respectively. In order to explain that the catalytic activity in the hydrogenation of FAMEs, catalyzed by Rh/TPPTS in the aqueous phase goes through a maximum using cationic surfactants a simplified model of a Hartley ionic spherical micelle was proposed as shown in FIG. 8.

Figure 8:
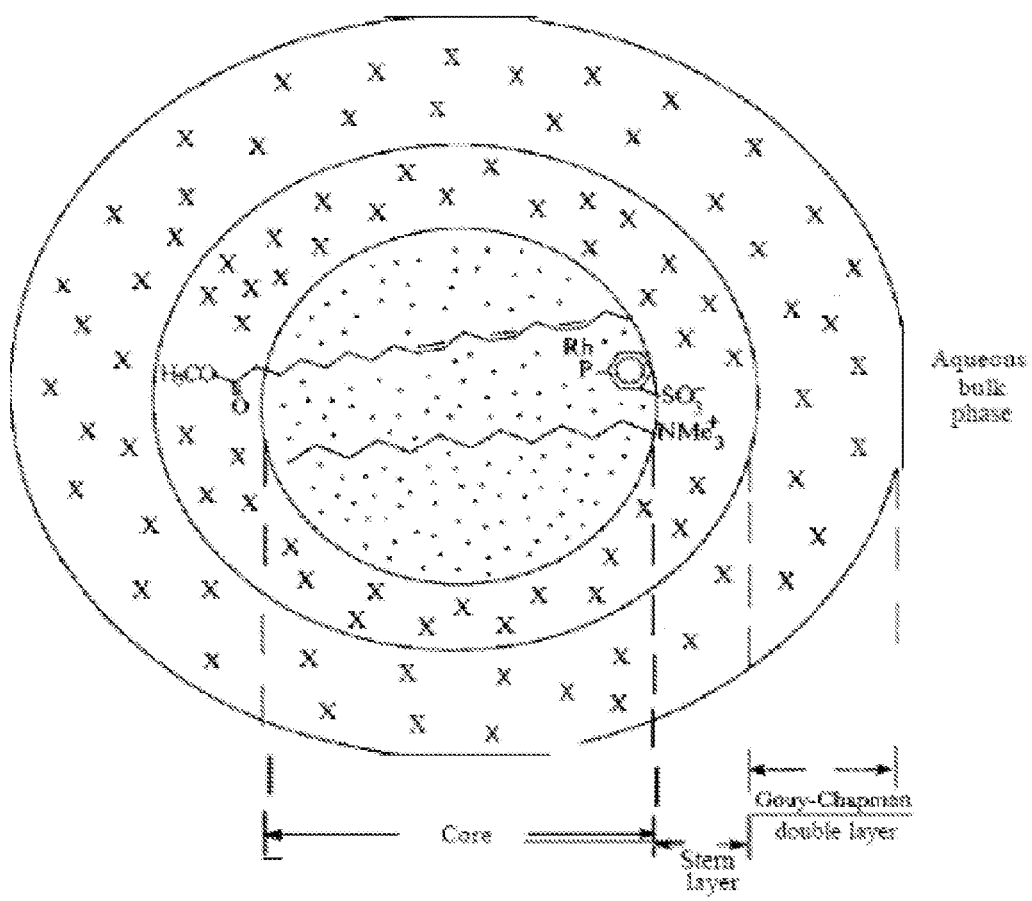
FIG. 8: Represents a simplified model of a Hartley ionic spherical micelle.

As depicted in FIG. 8, the micelle core is composed of the hydrophobic chain of the cationic surfactant where the hydrophobic tail of FAME with the C=C unsaturation units are located. Surrounding the core is the Stern layer where the charged head groups Nme3+ of DTAC interacted with the S03-groups of Rh/TPPTS catalyst are located together with the polar group of the hydrophilic ester moiety of FAME, along with the counter ions (Cl$^-$ and Na$^+$, depicted as X) of the ionic micelle. The rhodium atom of the Rh/TPPTS catalyst is probably located on the polarity gradient between the Stern layer and the micelle core. Therefore, the position of the rhodium in the micelle should be dependent on the HLB value of FAME itself and of the added surfactant. This dependence is in critical relationship between the length of the unsaturated hydrocarbon chain of FAME and the length and nature of the added conventional surfactant for obtaining maximum reactivity. It is well known [J. Mol. Catal. A: Chem. 231, p93f (2005); ibid. 101, p179f (1995); ibid. 189, p195f (2002)] that the addition of cationic surfactants to Rh/TPPTS catalytic systems accelerates the rates of catalytic reactions due to the attraction between the negatively charged Rh/TPPTS complex ions with the positively charged cationic end of the surfactant, therefore increasing the catalyst concentration in the micelle.

A typical example for a suitable zwitterionic surfactant is L-α-lecithin (L-α-phosphatidylcholine) which is present in vegetable oils [J. Sep. Sci. 27, p181f (2004)]:

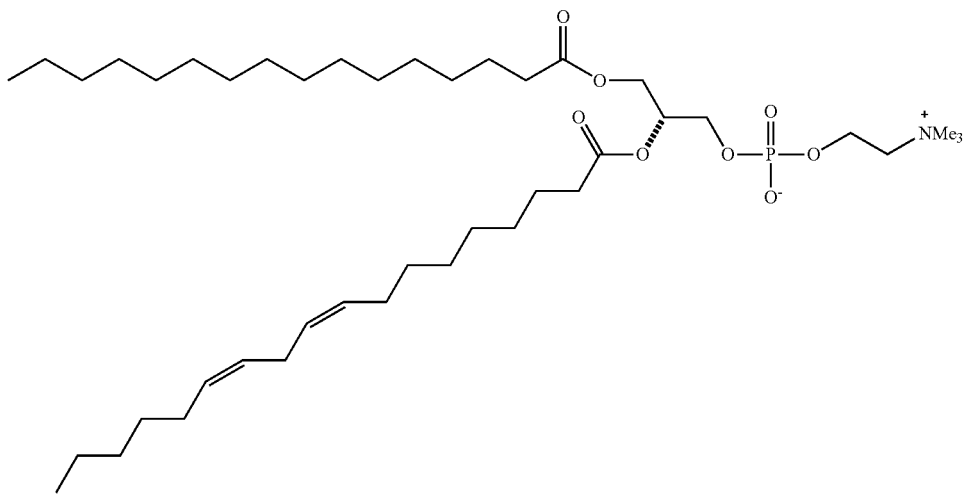

Therefore, in the hydrogenation of alkyl esters of vegetable oils catalyzed by Rh/TPPTS in aqueous/organic two phase systems the micellar catalysis takes place without addition of any surfactants even with high catalytic activities because the surfactant lecithin is inherent in the FAMEs starting material mixture. Other suitable amphoteric surfactants among others are: 3-(N,N-dodecyldimethylammonium) propanesulfonate, 3-(N,N-tetradecyldimethylammonium) propanesulfonate, 3-(N,N-cetyl-dimethylammonium) propanesulfonate, 3-(N,N-octadecyldimethylammonium) propanesulfonate, N,N-dimethyl-loctylamino-N-oxide and N,N-dimethyl-decylamino-N-oxide.

Typical examples for suitable nonionic surfactants of Brij-type are among others the following systems:

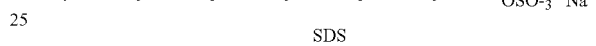

dodecylbenzonesulfonate (DBS), sodium 1-heptanesulfonate, sodium 1-octanesulfonate, sodium 1-nonanesulfonate, sodium 1-decanesulfonate and salts of linear alkylbenzenesulfonate (LABS).

Suitable phase transfer catalysts also useful as co-catalysts according to the present invention are summarised in J. Am. Chem. Soc., 93, p195f, (1971) and GB 1,227,144 A1. Both documents are therefore incorporated by reference. Typical

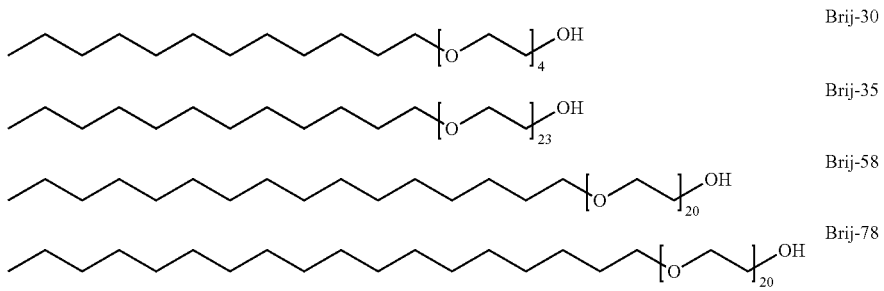

and of Triton X-type such as:

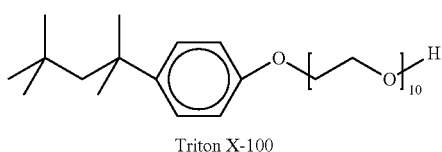

as well as Triton X-114, Triton X-305 and Triton X-405.

Anionic surfactants suitable as cocatalysts in this biphasic catalytic hydrogenation reaction are among others: sodium dodecylsulfate (SDS):

examples are tetraalkylammonium salts with short alkyl groups, benzyltrialkylammonium salts, tetraalkylphosphonium salts, benzyl-trialkylphosphonium salts and their mixtures. In preferred embodiments of the present invention tetra-n-butylammonium, tri-n-butylmethylammonium, benzyltriethylammonium, tetra-n-butylphosphonium, tri-n-butylmethylphosphonium, benzyltriethylphosphonium in form of their chlorides, bromides or hydrogensulfates are used.

The molar ratio between the co-catalyst and the ligand is typically about 1:2 to about 1:20 and preferably about 1:3 to about 1:10.

Hydrogenation Process

The process according to the present invention follows the scheme which is shown below:

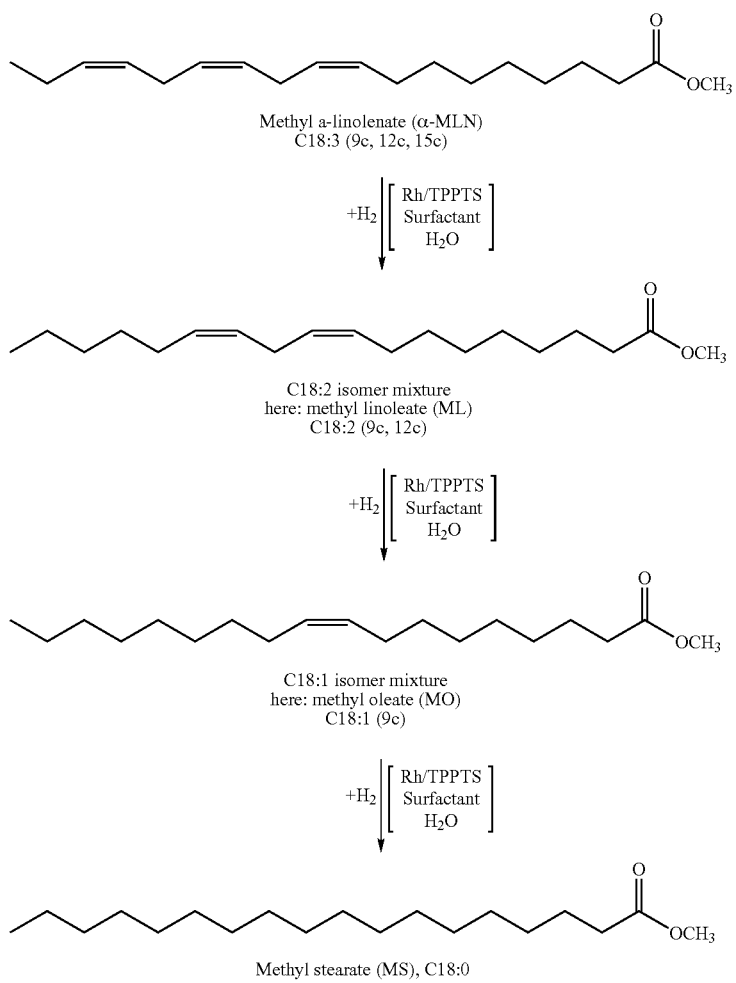

In the first step the catalyst is prepared, for example by simply dissolving the Group VIII, Group IX, or Group X metal salt (e.g. $RhCl_3 \cdot 3H_2O$) and the hydrophilic ligand (e.g. the sodium salt of TPPTS) in demineralised and deaerated water. The aqueous catalyst system is mixed with the polyunsaturated fatty acid alkyl ester or glyceride to result in a two-phase system formed by the aqueous catalyst solution and the polyunsaturated fatty acid alkyl ester or glyceride. Usually, the pH value is adjusted to be about 7 by adding a buffer. The ratio between the volume of the aqueous and the organic phase is typically about 5:1 to about 1:5 and preferably about 1:1. It has been found advantageous to support the phase separation by adding an inert organic solvent, for example diethyl ether, pentane, hexane or toluene typically in amounts equivalent to the volume of the ester. The mixture comprising the ester or glyceride, the catalyst and optionally the organic solvent is transferred into a stirred autoclave purged with argon and after a number of pressurising-depressurising cycles with hydrogen in order to remove all traces of oxygen. Then the reactor is heated up to 50 to 120, preferably 70 to 80° C. at kept there for a reaction time of 5 to 240, preferably 10 to 30 minutes. During this time the pressure rises up to 5 to 100 bar. Once the reaction has been completed the mixtures is cooled to room temperature and depressurised. The upper organic layer comprising the hydrogenation product is separated from the lower aqueous layer and subjected to purification, e.g. drying and/or distillation. The aqueous layer containing the catalyst is recycled.

Another object of the present invention is directed to unsaturated fatty acid alkyl esters or glycerides having a total content of C18:1 of about 30 to about 80 Mol-% which are obtainable by partial hydrogenation of unsaturated fatty acid esters having a total content of (C18:2+C18:3) of at least 65 Mol-%—calculated on the total amount of C18 moieties in the ester—obtainable according to the process of claim 1. In the total content of C18:1 the cis-C18:1 components rise up to 90% while keeping down to about 10% the trans-C18:1 isomers.

INDUSTRIAL APPLICATION

As explained above, the present invention is extremely useful to provide fatty acid alkyl esters or glycerides with a single double bond and even in higher amounts the desired cis-C18:1 isomers by selective hydrogenation of the respective polyunsaturated starting materials. Another object of the present invention is therefore the use of catalysts consisting of a Group VIII, Group IX, or Group X metal and hydrophilic ligand for the homogenous hydrogenation of polyunsaturated fatty acid alkyl esters or glycerides. A last object of the present invention is directed to the use of the hydrogenated fatty acid alkyl esters or glycerides as a biofuel, as biolubricants, as fatty food-stuffs with a low trans-isomers content, as a cosmetic or pharmaceutical ingredient or as a plasticizer for PVC or non-chlorine polymers.

EXAMPLES

Example 1a

Transesterification of Linseed Oil

A 1000-ml, three-necked, round-bottom flask, equipped with a mechanical stirrer, a thermometer and a condenser was charged with 279.0 g of linseed oil and a solution of 182.8 g methanol containing 2.79 g of NaOH. The mixture was stirred at 55° C. for 100 min. The course of the reaction was followed by thin layer chromatography. The reaction mixture was then cooled and further stirred for 8 h at room temperature. After phase separation resulted in the isolation of the methyl esters of linseed oil (MELO) and the glycerol. The glycerol phase (bottom layer) was removed and kept in a separate container. The MELO phase (top layer) was washed with distilled water several times (pH=7.0), dried over $Na_2SO_4$ to obtain 210 g of MELO mixture which was used as starting material in the hydrogenation reaction without any purification by distillation. Methyl esters composition of linseed oil was determined by gas chromatography; the details are exhibited in Table A1:

TABLE A1

Composition of the starting product (MELO)*

| Compound | Content [Mol %] |
|---|---|
| Methyl α-linolenate (α-MLN), C18:3 (9c, 12c, 15c) | 65.8 |
| Methyl linoleate (ML), C18:2 (9c, 12c) | 13.3 |
| Methyl oleate (MO), C18:1 (9c) | 18.5 |
| Methyl stearate (MS), C18:0 | 2.4 |

*The starting product MELO contained 4.8% of methyl palmitate (MP) which was ignored in the experiments.

Example 1b

Typical Hydrogenation Procedure of Methyl Esters of Linseed Oil (MELO) Catalyzed by Water Soluble Rh/TPPTS Complexes in Aqueous/Organic Two Phase Micellar Systems (See Table 4, Entry 4/13)

2.63 mg (0.01 mmol) $RhCl_3.3H_2O$, 24.63 mg (0.04 mmol) TPPTS, (TPPTS/Rh molar ratio=4), 21.11 mg (0.08 mmol) DTAC (DTAC/TPPTS molar ratio=2) and 163.3 mg (1.2 mmol) $KH_2PO_4$ were dissolved in 30 ml deaerated distilled demineralized water and within 1 min of stirring the pH value of the solution was adjusted to 7.0 using 5% aqueous NaOH. This aqueous catalyst solution, having a rhodium concentration of only 34 ppm, with an organic solution of 15.03 g (100.0 mmol of C═C units) of MELO mixture dissolved in 18.8 ml ether, which results a two-phase system with a volume ratio of aqueous/organic phase=3/3.5, were charged into an Autoclave Engineers autoclave (100 ml) which was previously evacuated and filled with argon. In the reaction mixture the molar ratio of C═C units/Rh was 10000. After a number of pressurising-depressurising cycles with hydrogen to remove the last traces of argon/air oxygen, the autoclave was pressured and contents were heated with stirring (stirring rate=850 rpm). At the reaction temperature of 80° C. the hydrogen partial pressure was 10 MPa (100 bar) and the reaction time 10 min. After the reaction the autoclave was cooled to room temperature, vented of hydrogen and the reaction mixture removed. The upper organic layer was separated from the lower aqueous layer and was dried over sodium sulphate. The aqueous layer containing the catalyst was recycled. The organic layer containing the products was analyzed by gas chromatography. The details are shown in Table A2:

TABLE A2

Composition of the hydrogenation product (H-MELO)*

| Compound | Content [Mol %] |
|---|---|
| C18:3 mixture | 0.7 |
| C18:2 mixture | 24.5 |
| C18:1 mixture | 64.0 |
| cis-C18:1 (total) | 46.3 |
| trans-C18:1 (total) | 17.7 |
| C18:0 | 10.8 |

*The starting product MELO contained 4.8% of methyl palmitate (MP) which was ignored in the experiments The turnover frequency (TOF) in this hydrogenation reaction was 39056 $h^{-1}$. TOF is defined as mole of hydrogenated C═C units of C18:3, C18:2 and C18:1 isomers in the mixture of MELO per mole of rhodium per hour.

Example 2a

Transesterification of Sunflower Oil

A 1000-ml, three-necked, round-bottom flask, equipped with a mechanical stirrer, a thermometer and a condenser was charged with 322.0 g of sunflower oil and a solution of 203.0 g methanol containing 3.22 g of NaOH. The mixture was stirred at 55° C. for 70 min. The course of the reaction was followed by thin layer chromatography. The reaction mixture was then cooled and further stirred for 4.5 h at room temperature. After phase separation resulted in the isolation of the methyl esters of sunflower oil (MESO) and the glycerol. The glycerol phase (bottom layer) was removed and kept in a separate container. The MESO phase (top layer) was washed with distilled water several times (pH=7.0), dried over $Na_2SO_4$ to obtain 230 g of MESO mixture which was used as starting material in the hydrogenation reaction without any purification by distillation. Methyl esters composition of sunflower oil was determined by gas chromatography. The details are shown in Table B1:

TABLE B1

Composition of the starting product (MESO)*

| Compound | Content [Mol %] |
|---|---|
| Methyl linoleate (ML), C18:2 (9c, 12c) | 68.8 |
| Methyl oleate (MO), C18:1 (9c) | 28.4 |
| Methyl stearate (MS), C18:0 | 2.8 |

*The starting product MESO contained 5.5% of methyl palmitate (MP) which was igored in the experiments Example 2b Typical Hydrogenation Procedure of Methyl Esters of Sunflower Oil (MESO) Catalyzed by Water Soluble Rh/TPPTS Complexes in Aqueous/Organic Two Phase Systems (See Table 5, Entry 5/21)

1.32 mg (0.005 mmol) $RhCl_3.3H_2O$ and 9.24 mg (0.015 mmol) TPPTS, (TPPTS/Rh molar ratio=3) were dissolved in 15 ml deaerated distilled demineralized water within 1 min of stirring. This aqueous catalyst solution, having a rhodium concentration of only 34 ppm, with 15.15 g (75.0 mmol of C═C units) of MESO mixture [9.87 g of ML, 4.09 g of MO, 0.42 g of MS, 0.77 g of methyl palmitate(MP)] which results a two-phase system with a volume ratio of aqueous/organic phase=1.5/1.6, were charged into an Autoclave Engineers autoclave (100 ml) which was previously evacuated and filled with argon. In the reaction mixture the molar ratio of C═C units/Rh was 15000. After a number of pressurising-depressurising cycles with hydrogen to remove the last traces of argon/air oxygen, the autoclave was pressured and contents were heated with stirring (stirring rate=850 rpm). At the reaction temperature of 120° C. the hydrogen partial pressure was 5 MPa (50 bar) and the reaction time 5 min. After the reaction the autoclave was cooled to room temperature, vented of hydrogen and the reaction mixture removed. The upper organic layer was separated from the lower aqueous layer and was dried over sodium sulphate. The aqueous layer containing the catalyst was recycled. The organic layer containing the products was analyzed by gas chromatography. The details are shown in Table B2:

TABLE B2

Composition of the hydrogenation product (H-MESO)*

| Compound | Content [Mol %] |
|---|---|
| C18:2 isomer mixture | 6.0 |
| C18:1 isomer mixture | 68.3 |
| cis-C18:1 (total) | 35.8 |
| trans-C18:1 (total) | 32.5 |
| C18:0 | 25.7 |

*The hydrogenation product H-MESO (15.24 g) contained: 0.86 g of C18:2, 9.87 g of C18:1 (5.172 g of cis-C18:1 and 4.698 g of trans-C18:1) 3.74 g of MS and 0.77 g of MP The turnover frequency (TOF) in this hydrogenation reaction was 117286 $h^{-1}$. TOF is defined as mole of hydrogenated C═C units of C18:2 and C18:1 isomers in the mixture of MESO per mole of rhodium per hour.

Example 3

Influence of pH Value

The following hydrogenation examples were conducted according to the general instructions as provided in Examples 1b and 2b, however, at changing pH values. The reaction conditions were the following:

T=70° C.

$P_{H2}$=10 bar t=2 h 2.63 mg (0.01 mmol) $RhCl_3.3H_2O$, 18.47 mg (0.03 mmol) TPPTS (TPPTS/Rh molar ratio=3), 15.83 mg (0.06 mmol) DTAC (DTAC/TPPTS molar ratio=2)

802.7 mg (5.0 mmol of C═C) of MELO mixture 1 (C═C/Rh molar ratio=500)

30 ml deaerated distilled demineralized water

[Rh]=34 ppm.

Addition of a solution of MELO mixture 1 dissolved in 10 ml n-hexane results a two-phase system with a volume ratio of aqueous/organic phase=3/1.1. Stirring rate=770 rpm. The details are exhibited in Table 1:

TABLE 1

Micellar biphasic hydrogenation of MELO catalyzed by Rh/TPPTS complexes under various pH values

| Entry | Ester | Catalyst Precursor | pH | C18:3 (total) mol % | C18:2 (total) mol % | C18:1 (total) mol % | cis-C18:1 (total) mol % | trans-C18:1 (total) mol % | MS mol % | TOF[b] $h^{-1}$ |
|---|---|---|---|---|---|---|---|---|---|---|
| — | MELO 1[c] | — | — | 56.8[d] | 16.7[e] | 22.5[f] | 22.5 | — | 4.0 | — |
| 1/1 | MELO 1[c] | $RhCl_3•3H_2O$/TPPTS | 4.1[g] | 2.5 | 28.8 | 57.7 | 46.6 | 11.1 | 11.0 | 136 |
| 1/2 | MELO 1[c] | $RhCl_3•3H_2O$/TPPTS | 7.0[h] | 0.9 | 12.8 | 73.5 | 42.5 | 31.0 | 12.8 | 151 |
| 1/3 | MELO 1[c] | $RhCl_3•3H_2O$/TPPTS | 10.5[i] | 5.1 | 34.3 | 53.4 | 43.8 | 9.6 | 7.2 | 130 |

[b]Defined as mole of hydrogenated C═C units of C18:3, C18:2 and C18:1 isomers in the mixture of MELO per mole of rhodium per hour.
[c]The starting material of MELO mixture 1(α-MLN, ML, MO, MS) contained 4.8% of methyl palmitate (MP) which was ignored in the experiments.
[d]Methyl α-linolenate (α-MLN), C18:3 (9c, 12c, 15c);
[e]Methyl linoleate (ML), C18:2 (9c, 12c)
[f]Methyl oleate (MO), C18:1 (9c).
[g]No buffer.
[h]163.3 mg (1.2 mmol) $KH_2PO_4$, pH adjusted with 5% aqueous NaOH.
[i]pH adjusted with 5% aqueous NaOH, no $KH_2PO_4$.

Example 4

Influence of Organic Solvents

The following hydrogenation examples were conducted according to the general instructions as provided in Examples 1b and 2b, however, using different solvents. The reaction conditions were the following:

T=70-80° C.

$P_{H2}$=10 bar 2.63 mg (0.01 mmol) $RhCl_3.3H_2O$ 30 ml deaerated distilled demineralized water

[Rh]=34 ppm.

C═C/Rh molar ratio=500-1000

Addition of a solution of FAME or MELO 1 dissolved in 10 ml organic solvent results a two-phase system with a volume ratio of aqueous/organic phase=3/1. Stirring rate=770 rpm; except in entries 2/4 and 2/5 a rate of 850 rpm. The details are exhibited in Table 2:

TABLE 2

Micellar biphasic hydrogenation of fatty esters catalyzed by Rh/TPPTS complexes in the presence of various organic solvents

| Entry | Ester | Catalyst Precursor | Solvent | T °C. | C18:3 (total) mol % | C18:2 (total) mol % | C18:1 (total) mol % | cis-C18:1 (total) mol % | trans-C18:1 (total) mol % | MS mol % | TOF[b] h$^{-1}$ |
|---|---|---|---|---|---|---|---|---|---|---|---|
| — | FAME | — | — | — | 83.0[c] | 17.0[d] | — | — | — | — | — |
| 2/1[e] | FAME | RhCl$_3$•3H$_2$O/TPPTS | Pentane | 80 | 2.6 | 25.8 | 56.5 | 40.5 | 16.0 | 15.1 | 804 |
| 2/2[e] | FAME | RhCl$_3$•3H$_2$O/TPPTS | Hexane | 80 | 3.9 | 30.5 | 51.2 | 37.5 | 13.7 | 14.4 | 791 |
| 2/3[e] | FAME | RhCl$_3$•3H$_2$O/TPPTS | Toluene | 80 | 14.5 | 47.9 | 29.8 | 23.2 | 6.6 | 7.8 | 685 |
| — | MELO 1[f] | — | — | — | 56.8[c] | 16.7[d] | 22.5[g] | 22.5[g] | — | 4.0 | — |
| 2/4[h] | MELO 1 | RhCl$_3$•3H$_2$O/TPPTS | Pentane | 70 | 41.2 | 21.3 | 33.2 | 31.4 | 1.8 | 4.3 | 932 |
| 2/5[h] | MELO 1 | RhCl$_3$•3H$_2$O/TPPTS | Ether | 70 | 1.2 | 22.0 | 67.2 | 54.2 | 13.0 | 9.6 | 3336 |

[b]Defined as mole of hydrogenated C=C units of C18:3, C18:2 and C18:1 isomers in the mixture of FAME or MELO per mole of rhodium per hour.
[c]Methyl α-linolenate (α-MLN), C18:3 (9c, 12c, 15c).
[d]Methyl linoleate (ML), C18:2 (9c, 12c).
[e]TPPTS/Rh molar ratio = 3; DTAC/TPPTS molar ratio = 3; t = 30 min. No buffer (pH = 4.5-5.1)
[f]The starting material of MELO mixture (α-MLN, ML, MO, MS) contained 4.8% of methyl palmitate (MP) which was ignored in the experiments.
[g]Methyl oleate (MO), C18:1 (9c).
[h]TPPTS/Rh molar ratio = 4; DTAC/TPPTS molar ratio = 2; t = 10 min. 163.3 mg (1.2 mmol) KH$_2$PO$_4$, pH = 7.0 adjusted with 5% aqueous NaOH.

Example 4

Influence of C=C/Rh Molar Ratio

The following hydrogenation examples were conducted according to the general instructions as provided in Examples 1b and 2b, however, using different C=C/Rh molar ratios. The reaction conditions were the following:

T=70° C.
$P_{H2}$=10 bar
t=2 h
2.63 mg (0.01 mmol) RhCl$_3$.3H$_2$O, 18.47 mg (0.03 mmol) TPPTS (P/Rh molar ratio=3), 15.83 mg (0.06 mmol) DTAC (DTAC/TPPTS molar ratio=2)
30 ml deaerated distilled demineralized water
[Rh]=34 ppm
163.3 mg (1.2 mmol) KH$_2$PO$_4$
pH=7.0 adjusted with 5% aqueous NaOH
Addition of a solution of MELO mixture dissolved in 10 ml hexane results a two-phase system with a volume ratio of aqueous/organic phase=3/1-3/1.2. Stirring rate=770 rpm. The details are shown in Table 3:

TABLE 3

Micellar biphasic hydrogenation of MELO catalyzed by Rh/TPPTS complexes at low C=C/Rh molar ratios

| Entry | Ester | Catalyst Precursor | C=C Rh | C18:3 (total) mol % | C18:2 (total) mol % | C18:1 (total) mol % | cis-C18:1 (total) mol % | trans-C18:1 (total) mol % | MS mol % | TOF[b] h$^{-1}$ |
|---|---|---|---|---|---|---|---|---|---|---|
| — | MELO 1[c] | — | — | 56.8[d] | 16.7[e] | 22.5[f] | 22.5[f] | — | 4.0 | — |
| 3/1 | MELO 1 | RhCl$_3$•3H$_2$O/TPPTS | 50 | 2.9 | 8.0 | 52.2 | 33.1 | 19.1 | 36.9 | 16 |
| 3/2 | MELO 1 | RhCl$_3$•3H$_2$O/TPPTS | 100 | 0.2 | 3.8 | 58.9 | 30.2 | 28.7 | 37.1 | 35 |
| 3/3 | MELO 1 | RhCl$_3$•3H$_2$O/TPPTS | 300 | 0.5 | 8.3 | 73.7 | 40.9 | 32.8 | 17.5 | 98 |
| 3/4 | MELO 1 | RhCl$_3$•3H$_2$O/TPPTS | 500 | 0.9 | 12.8 | 73.5 | 42.5 | 31.0 | 12.8 | 150 |
| 3/5 | MELO 1 | RhCl$_3$•3H$_2$O/TPPTS | 700 | 2.2 | 27.7 | 62.2 | 53.9 | 8.3 | 7.9 | 189 |
| 3/6 | MELO 1 | RhCl$_3$•3H$_2$O/TPPTS | 1000 | 5.3 | 35.7 | 53.2 | 43.9 | 9.3 | 5.8 | 254 |
| 3/7 | MELO 1 | RhCl$_3$•3H$_2$O/TPPTS | 1500 | 28.1 | 30.4 | 36.7 | 33.4 | 3.3 | 4.8 | 205 |

[b]Defined as mole of hydrogenated C=C units of C18:3, C18:2 and C18:1 isomers in the mixture of MELO per mole of rhodium per hour.
[c]The starting material of MELO 1 mixture (α-MLN, ML, MO, MS) contained 4.8% of methyl palmitate (MP) which was ignored in the experiments.
[d]Methyl α-linolenate (α-MLN), C18:3 (9c, 12c, 15c).
[e]Methyl linoleate (ML), C18:2 (9c, 12c).
[f]Methyl oleate (MO), C18:1 (9c).

Example 5

Variation of Other Parameters

The following hydrogenation examples were conducted according to the general instructions as provided in Examples 1b and 2b, however using different C=C/Rh molar ratios, pressures and temperatures. The reaction conditions were the following:

t=10 min
2.63 mg (0.01 mmol) RhCl$_3$·3H$_2$O, 24.63 mg (0.04 mmol) TPPTS (TPPTS/Rh molar ratio=4), 21.11 mg (0.08 mmol) DTAC (DTAC/TPPTS molar ratio=2)
30 ml deaerated distilled demineralized water
[Rh]=34 ppm. 163.3 mg (1.2 mmol) KH$_2$PO$_4$
pH=7.0 adjusted with 5% aqueous NaOH Addition of a solution of MELO mixture dissolved in 10 ml ether results a two-phase system with a volume ratio of aqueous/organic phase=3/1.1-3/2.6; except entry 4/13, a two-phase system consisting of 30 ml of aqueous solvent with a solution of 15.03 g (100.0 mmol of C=C) of MELO dissolved in 18.8 ml of ether (aqueous/organic phase=3/3.5). Stirring rate=850 rpm. The details are shown in Table 4:

cationic surfactants. The reaction conditions were the following:

1.32 mg (0.005 mmol) RhCl$_3$·3H$_2$O; except entries 5/1-5/4, 5/9, 2.63 mg (0.01 mmol) RhCl$_3$·3H$_2$O; 9.24 mg (0.015 mmol) TPPTS (TPPTS/Rh molar ratio=3); except entries 5/1, 5/3, 5/4, 24.63 mg (0.04 mmol) TPPTS (TPPTS/Rh molar ratio=4); except entry 5/2, 30.79 mg (0.05 mmol) TPPTS (TPPTS/Rh molar ratio=5);

15 ml deaerated distilled demineralized water, pH=4.3; except entries 5/1-5/4, 5/8, 5/9, 30 ml water, pH=4.5;

[Rh]=34 ppm; except entry 5/8, [Rh]=17 ppm.

TABLE 4

Micellar biphasic hydrogenation of MELO catalyzed by Rh/TPPTS complexes at different partial H$_2$ pressures, temperatures and higher C=C/Rh molar ratios

| Entry | Ester | Catalyst Precursor | C=C/Rh | T °C. | p$_{H2}$ bar | C18:3 (total) mol % | C18:2 (total) mol % | C18:1 (total) mol % | cis-C18:1 (total) mol % | trans-C18:1 (total) mol % | MS mol % | TOF[b] h$^{-1}$ |
|---|---|---|---|---|---|---|---|---|---|---|---|---|
| — | MELO 1[c] | — | — | — | — | 56.8[d] | 16.7[e] | 22.5[f] | 22.5[f] | — | 4.0 | — |
| 4/1 | MELO 1 | RhCl$_3$·3H$_2$O/TPPTS | 1000 | 70 | 10 | 1.2 | 22.0 | 67.2 | 54.2 | 13.0 | 9.6 | 3336 |
| 4/2 | MELO 1 | RhCl$_3$·3H$_2$O/TPPTS | 1000 | 70 | 50 | 0.5 | 6.8 | 65.2 | 43.1 | 22.1 | 27.5 | 3976 |
| 4/3 | MELO 1 | RhCl$_3$·3H$_2$O/TPPTS | 1000 | 70 | 70 | 0.3 | 5.0 | 58.9 | 39.3 | 19.6 | 35.8 | 4097 |
| 4/4 | MELO 1 | RhCl$_3$·3H$_2$O/TPPTS | 2000 | 70 | 70 | 0.6 | 5.9 | 65.0 | 42.9 | 22.1 | 28.5 | 8054 |
| 4/5 | MELO 1 | RhCl$_3$·3H$_2$O/TPPTS | 3000 | 70 | 70 | 1.9 | 9.9 | 65.3 | 47.8 | 17.5 | 22.9 | 11125 |
| — | MELO 2[c] | — | — | — | — | 63.9[d] | 16.5[e] | 17.4[f] | 17.4[f] | — | 2.2 | — |
| 4/6 | MELO 2 | RhCl$_3$·3H$_2$O/TPPTS | 3000 | 70 | 70 | 37.0 | 22.4 | 32.3 | 29.1 | 3.2 | 8.3 | 4863 |
| 4/7[g] | MELO 2 | RhCl$_3$·3H$_2$O/TPPTS | 3000 | 70 | 70 | 40.4 | 17.0 | 31.9 | 28.3 | 3.6 | 10.7 | 4256 |
| — | MELO 3[c] | — | — | — | — | 65.8[d] | 13.3[e] | 18.5[f] | 18.5[f] | — | 2.4 | — |
| 4/8 | MELO 3 | RhCl$_3$·3H$_2$O/TPPTS | 3000 | 70 | 10 | 39.2 | 24.3 | 32.3 | 29.8 | 2.5 | 4.2 | 4783 |
| 4/9 | MELO 3 | RhCl$_3$·3H$_2$O/TPPTS | 3000 | 70 | 40 | 2.0 | 26.5 | 62.2 | 47.3 | 14.9 | 9.3 | 11495 |
| 4/10 | MELO 3 | RhCl$_3$·3H$_2$O/TPPTS | 3000 | 70 | 70 | 0.8 | 10.1 | 67.0 | 39.8 | 27.2 | 22.1 | 12274 |
| 4/11 | MELO 3 | RhCl$_3$·3H$_2$O/TPPTS | 3000 | 70 | 100 | 0.6 | 10.6 | 63.9 | 35.9 | 28.0 | 24.9 | 12214 |
| 4/12 | MELO 3 | RhCl$_3$·3H$_2$O/TPPTS | 10000 | 70 | 100 | 20.4 | 32.0 | 42.0 | 36.7 | 5.3 | 5.6 | 27234 |
| 4/13 | MELO 3 | RhCl$_3$·3H$_2$O/TPPTS | 10000 | 80 | 100 | 0.7 | 24.5 | 64.0 | 46.3 | 17.7 | 10.8 | 39056 |

[b]Defined as mole of hydrogenated C=C units of C18:3, C18:2 and C18:1 isomers in the mixture of MELO per mole of rhodium per hour.
[c]The starting material of MELO mixture (α-MLN, ML, MO, MS) contained 3.4-4.8% of methyl palmitate (MP) which was ignored in the experiments.
[d]Methyl α-linolenate (α-MLN), C18:3 (9c, 12c, 15c).
[e]Methyl linoleate (ML), C18:2 (9c, 12c).
[f]Methyl oleate (MO), C18:1 (9c).
[g]No buffer (pH = 4.5).

Example 6

Absence of Solvents and Cationic Surfactants

The following hydrogenation examples were conducted according to the general instructions as provided in Examples 1b and 2b, however in the absence of organic solvents and Addition of MESO mixture results a two phase system with a volume ratio of aqueous/organic phase=15/22-15/2.2. For example in entry 5/12: 15 ml aqueous solvent containing the catalyst and 19.947 g=22.0 ml (100.0 mmol of C=C) of MESO mixture results a two phase system with a volume ratio of aqueous/organic phase=15/22. For entries 5/1-5/6: 18.8-6.2 ml ether was added. Stirring rate=850 rpm. The details are shown in Table 5:

TABLE 5

Biphasic hydrogenation of MESO catalyzed by Rh/TPPTS complexes in the absence of organic solvents and cationic surfactants

| Entry | Ester | Catalyst Precursor | C=C Rh | T °C. | $p_{H2}$ bar | t min | C18:2 (total) mol % | C18:1 (total) mol % | cis-C18:1 (total) mol % | trans-C18:1 (total) mol % | MS mol % | TOF[b] h$^{-1}$ |
|---|---|---|---|---|---|---|---|---|---|---|---|---|
| — | MESO 1[c] | — | — | — | — | — | 69.2[d] | 27.8[e] | 27.8[e] | — | 3.0 | — |
| 5/1[f,g] | MESO 1 | RhCl$_3$·3H$_2$O/TPPTS | 1000 | 70 | 70 | 10 | 43.2 | 39.3 | 35.4 | 3.9 | 17.5 | 1558 |
| 5/2[f,g] | MESO 1 | RhCl$_3$·3H$_2$O/TPPTS | 1000 | 100 | 70 | 10 | 40.4 | 44.6 | 38.0 | 6.6 | 15.0 | 1727 |
| 5/3[g] | MESO 1 | RhCl$_3$·3H$_2$O/TPPTS | 1000 | 110 | 50 | 10 | 11.6 | 65.1 | 45.2 | 19.9 | 23.3 | 3456 |
| 5/4[g] | MESO 1 | RhCl$_3$·3H$_2$O/TPPTS | 10000 | 110 | 50 | 10 | 56.8 | 36.7 | 33.5 | 3.2 | 6.5 | 7435 |
| 5/5 | MESO 1 | RhCl$_3$·3H$_2$O/TPPTS | 10000 | 120 | 50 | 10 | 9.6 | 63.9 | 31.7 | 32.2 | 26.5 | 35733 |
| 5/6 | MESO 1 | RhCl$_3$·3H$_2$O/TPPTS | 20000 | 120 | 50 | 10 | 46.6 | 44.9 | 34.0 | 10.9 | 8.5 | 13531 |
| 5/7 | MESO 1 | RhCl$_3$·3H$_2$O/TPPTS | 10000 | 120 | 50 | 10 | 10.8 | 67.0 | 35.9 | 31.1 | 22.2 | 35040 |
| 5/8 | MESO 1 | RhCl$_3$·3H$_2$O/TPPTS | 20000 | 120 | 50 | 10 | 44.0 | 49.3 | 37.1 | 12.2 | 6.7 | 30216 |
| 5/9 | MESO 1 | RhCl$_3$·3H$_2$O/TPPTS | 20000 | 130 | 50 | 10 | 59.4 | 36.2 | 30.0 | 6.2 | 4.4 | 11681 |
| 5/10 | MESO 1 | RhCl$_3$·3H$_2$O/TPPTS | 15000 | 120 | 50 | 10 | 16.3 | 64.5 | 35.8 | 28.7 | 19.2 | 47609 |
| 5/11 | MESO 1 | RhCl$_3$·3H$_2$O/TPPTS | 20000 | 120 | 50 | 10 | 25.2 | 61.9 | 34.8 | 27.1 | 12.9 | 52845 |
| 5/12 | MESO 1 | RhCl$_3$·3H$_2$O/TPPTS | 20000 | 120 | 50 | 5 | 38.6 | 52.1 | 36.0 | 16.1 | 9.3 | 73303 |
| 5/13 | MESO 1 | RhCl$_3$·3H$_2$O/TPPTS | 17500 | 120 | 50 | 5 | 33.8 | 54.9 | 36.0 | 18.9 | 11.3 | 74280 |
| — | MESO 2[c] | — | — | — | — | — | 68.8[d] | 28.4[e] | 28.4[e] | — | 2.8 | — |
| 5/14 | MESO 2 | RhCl$_3$·3H$_2$O/TPPTS | 5000 | 120 | 50 | 5 | 0.2 | 34.1 | 15.4 | 18.7 | 65.7 | 42518 |
| 5/15 | MESO 2 | RhCl$_3$·3H$_2$O/TPPTS | 12000 | 120 | 50 | 5 | 3.1 | 58.0 | 26.1 | 31.9 | 38.9 | 97995 |
| 5/16[g] | MESO 2 | RhCl$_3$·3H$_2$O/TPPTS | 12000 | 120 | 50 | 5 | 14.7 | 62.7 | 35.2 | 27.5 | 22.6 | 81243 |
| 5/17[h] | MESO 2 | RhCl$_3$·3H$_2$O/TPPTS | 12000 | 120 | 50 | 5 | 23.6 | 58.4 | 34.2 | 24.2 | 18.0 | 68396 |
| 5/18 | MESO 2 | RhCl$_3$·3H$_2$O/TPPTS | 12000 | 110 | 50 | 5 | 15.3 | 62.3 | 31.5 | 30.8 | 22.4 | 80463 |
| 5/19 | MESO 2 | RhCl$_3$·3H$_2$O/TPPTS | 12000 | 130 | 50 | 5 | 11.0 | 60.2 | 26.3 | 33.9 | 28.8 | 86540 |
| 5/20 | MESO 2 | RhCl$_3$·3H$_2$O/TPPTS | 17500 | 120 | 50 | 5 | 20.0 | 64.7 | 40.0 | 24.7 | 15.3 | 107174 |
| 5/21 | MESO 2 | RhCl$_3$·3H$_2$O/TPPTS | 15000 | 120 | 50 | 5 | 6.0 | 68.3 | 35.8 | 32.5 | 25.7 | 117286 |

[b]Defined as mole of hydrogenated C=C units of C18:2 and C18:1 isomers in the mixture of MESO per mole of rhodium per hour.
[c]The starting material of MESO mixture contained 4.6-5.5% of methyl palmitate which was ignored in the experiments
[d]Methyl linoleate (ML), C18:2 (9c, 12c).
[e]Methyl oleate (MO), C18:1 (9c).
[f]DTAC/TPPTS molar ratio = 2.
[g]163.3 mg (1.2 mmol) KH2PO4, pH = 7.0 adjusted with 5% aqueous NaOH; except entry 5/16, 81.7 mg (0.60 mmol) KH2PO4, pH = 7.0 adjusted with 5% aqueous NaOH.
[h]pH = 10.4 adjusted with a solution of 5% aqueous NaOH, no KH2PO4.

These extremely high catalytic activities (TOF≈120000 h$^{-1}$) achieved by Rh/TPPTS catalysts in aqueous/organic two phase systems without any addition of external surfactant could be rationalized if one considers that in the crude fatty alkyl ester renewable starting material mixture, lecithin is present which acts as an inherent surfactant and micellar catalysis is operative.

EXPLANATIONS OF THE FIGURES

FIG. 1

Effect of Reaction Time on Micellar Biphasic Hydrogenation of MELO Using Rh/TPPTS Catalysts (x) % C18:3 (total); (■) % C18:2 (total); (□) % C18:1 (total); (♦) % C18:0. Reaction conditions: T=50° C.; PH$_2$=10 bar; 2.63 mg (0.01 mmol) RhCl$_3$.3H$_2$O, 24.63 mg (0.04 mmol) TPPTS (TPPTS/Rh molar ratio=4), 31.66 mg (0.12 mmol) DTAC (DTAC/TPPTS molar ratio=3), 802.7 mg (5.0 mmol of C=C) of MELO mixture 1 consisting of 56.8% α-MLN, 16.7% ML, 22.5% MO, 4.0% MS (C=C/Rh molar ratio=500); MELO 1 contained furthermore 4.8% of methyl palmitate (MP) which was ignored; 30 ml deaerated distilled demineralized water, [Rh]=34 ppm. 163.3 mg (1.2 mmol) $KH_2PO_4$, pH=7.0 adjusted with 5% aqueous NaOH. Addition of a solution of MELO mixture dissolved in 10 ml of n-hexane results a two-phase system with a volume ratio of aqueous/organic phase=3/1.1; stirring rate=770 rpm.

This figure shows that at reaction times longer than 100 minutes the reverse β-hydride elimination reaction occurs leading to isomerization of the olefinic starting material and not any more to hydrogenation reaction.

FIG. 2

Effect of Temperature on Micellar Biphasic Hydrogenation of MELO Using Rh/TPPTS Catalysts (x) % C18:3 (total); (■) % C18:2 (total); (□) % C18:1 (total); (♦) % C18:0. Reaction conditions: see FIG. 1, t=2 h.

This figure shows that at T>100° C. the reverse β-hydride elimination reaction occurs leading to isomerization of the olefinic starting material and not any more to hydrogenation reaction.

FIG. 3

Effect of TPPTS/Rh Molar Ratio on Micellar Biphasic Hydrogenation of MELO Using Rh/TPPTS Catalysts (x) % C18:3 (total); (■) % C18:2 (total); (□) % C18:1 (total); (♦) % C18:0. Reaction conditions: T=70° C.; P=10 bar; t=2 h; 2.63 mg (0.01 mmol) $RhCl_3.3H_2O$, DTAC/TPPTS molar ratio=3, 802.7 mg (5.0 mmol of C=C) of MELO mixture 1 (C=C/Rh molar ratio=500); 30 ml deaerated distilled demineralised water, [Rh]=34 ppm. 163.3 mg (1.2 mmol) $KH_2PO_4$, pH=7.0 adjusted with 5% aqueous NaOH. Addition of a solution of MELO mixture 1 dissolved in 10 ml of n-hexane results a two-phase system with a volume ratio of aqueous/organic phase=3/1.1; stirring rate=770 rpm.

FIG. 4

Effect of the Addition of Different Cationic Surfactants on Micellar Biphasic Hydrogenation of MELO Using Rh/TPPTS Catalysts (x) % C18:3 (total); (■) % C18:2 (total); (□) % C18:1 (total); (♦) % C18:0. Reaction conditions: T=70° C.; P=10 bar; t=2 h; 2.63 mg (0.01 mmol) $RhCl_3.3H_2O$, 18.47 mg (0.03 mmol) TPPTS (TPPTS/Rh molar ratio=3), (0.09 mmol) surfactant (surfactant/TPPTS molar ratio=3), 802.7 mg (5.0 mmol of C=C) of MELO mixture 1 (C=C/Rh molar ratio=500); 30 ml deaerated distilled demineralised water, [Rh]=34 ppm. 163.3 mg (1.2 mmol) $KH_2PO_4$, pH=7.0 adjusted with 5% aqueous NaOH. Addition of a solution of MELO mixture 1 dissolved in 10 ml of n-hexane results a two-phase system with a volume ratio of aqueous/organic phase=3/1.1; stirring rate=770 rpm.

FIG. 5

Micellar Biphasic Hydrogenation of MELO Using Rh/TPPTS Catalysts at Different DTAC/TPPTS Molar Ratios (x) % C18:3 (total); (■) % C18:2 (total); (□) % C18:1 (total); (♦) % C18:0. Reaction conditions: T=70° C.; P=10 bar; t=2 h; 2.63 mg (0.01 mmol) $RhCl_3.3H_2O$, 18.47 mg (0.03 mmol) TPPTS (TPPTS/Rh molar ratio=3), 802.7 mg (5.0 mmol of C=C) of MELO mixture 1 (C=C/Rh molar ratio=500); 30 ml deaerated distilled demineralised water, [Rh]=34 ppm. 163.3 mg (1.2 mmol) $KH_2PO_4$, pH=7.0 adjusted with 5% aqueous NaOH. Addition of a solution of MELO mixture 1 dissolved in 10 ml of n-hexane results a two-phase system with a volume ratio of aqueous/organic phase=3/1.1; stirring rate=770 rpm.

FIG. 6

Effect of the Addition of DTAC and Mixtures of DTAC with Various Non-Ionic and Anionic Surfactants on Micellar Biphasic Hydrogenation of MELO Using Rh/TPPTS Catalysts (x) % C18:3 (total); (■) % C18:2 (total); (□) % C18:1 (total); (♦) % C18:0. Reaction conditions: T=70° C.; P=10 bar; t=2 h; 2.63 mg (0.01 mmol) $RhCl_3.3H_2O$, 18.47 mg (0.03 mmol) TPPTS (TPPTS/Rh molar ratio=3), 15.83 mg (0.06 mmol) DTAC (DTAC/TPPTS molar ratio=2), 0.006 mmol of non-ionic and anionic surfactants (molar ratio of DTAC/non-ionic and anionic surfactants=10), 802.7 mg (5.0 mmol of C=C) of MELO mixture 1 (C=C/Rh molar ratio=500); 30 ml deaerated distilled demineralised water, [Rh]=34 ppm. 163.3 mg (1.2 mmol) $KH_2PO_4$, pH=7.0 adjusted with 5% aqueous NaOH. Addition of a solution of MELO mixture 1 dissolved in 10 ml of n-hexane results a two-phase system with a volume ratio of aqueous/organic phase=3/1.1; stirring rate=770 rpm.

FIG. 7

Micellar Biphasic Hydrogenation of MELO Using Rh/TPPTS Catalysts at Different Volume Ratios of the Aqueous to the Organic Solvent (x) % C18:3 (total); (■) % C18:2 (total); (□) % C18:1 (total); (♦) % C18:0. Reaction conditions: T=70° C.; P=10 bar; t=2 h; 2.63 mg (0.01 mmol) $RhCl_3.3H_2O$, 18.47 mg (0.03 mmol) TPPTS (TPPTS/Rh molar ratio=3), 15.83 mg (0.06 mmol) DTAC (DTAC/TPPTS molar ratio=2), 163.3 mg (1.2 mmol) $KH_2PO_4$, pH=7.0 adjusted with 5% aqueous NaOH. 802.7 mg (5.0 mmol of C=C) of MELO mixture 1 (C=C/Rh molar ratio=500). Addition of a solution of MELO mixture 1 dissolved in n-hexane results a two-phase system. $H_2O$ and nhexane: 40 ml total. Stirring rate=770 rpm.

FIG. 8

A Simplified Model of a Hartley Ionic Spherical Micelle

The micelle core is composed of the hydrophobic chain of the cationic surfactant where the hydrophobic tail of FAME with C=C unsaturation units are located. Surrounding the core is the Stem layer where the charged head groups $NMe^{3+}$ of DTAC interacted with $SO_3$— groups of the Rh/TPPTS catalyst are located together with the polar group of the hydrophilic esters moiety of FAME, along with the counter ions of the ionic micelle.

What is claimed is:

1. A process for the manufacture of C18:1-containing unsaturated fatty acid alkyl esters or glycerides, the process comprising:
partially hydrogenating polyunsaturated fatty acid esters or glycerides comprising at least 65 mole-% of C18:2 and C18:3, based on the total C18 content, in a two-phase aqueous/organic system, in the presence of a water-soluble catalyst consisting of a metal selected from the group consisting of rhodium, ruthenium, palladium, and mixtures thereof, and trisulfonated triphenylphosphine (TPPTS) as a hydrophilic ligand, wherein the resulting partial hydrogenation product comprises about 30 to about 80 mole-% of C18:1-containing unsaturated fatty acid alkyl esters or glycerides,
and wherein the fraction containing the C18:1 unsaturated fatty acid alkyl ester or glyceride is composed of 50 mol % or more cis-C18:1 components.

2. The process of claim 1 wherein said polyunsaturated fatty acid alkyl esters used as the starting material for the hydrogenation are represented by formula (I), $$R^1CO-OR^2 \quad (I)$$

wherein $R^1CO$ represents an acyl moiety having 6 to 22 carbon atoms and 2 or 3 double bonds, and $R^2$ represents an alkyl group having 1 to 4 carbon atoms.

3. The process of claim 1 wherein said unsaturated fatty acid alkyl esters used as the starting material for the hydrogenation comprise at least 60 mole-% of C18 residues.

4. The process of claim 1 wherein the polyunsaturated fatty acid esters are selected from methyl or ethyl esters of linseed, soybean or sunflower oil.

5. The process of claim 1 wherein the molar ratio between said metal and said hydrophilic ligand is about 1:1 to about 1:6.

6. The process of claim 1 wherein the content of said metal in the hydrogenation mixture is about 10 ppm to about 50 ppm.

7. The process of claim 1 wherein the molar ratio of alkene double bonds to metal is about 500 to about 25,000.

8. The process of claim 1 further comprising a co-catalyst, selected from the group consisting of cationic, zwitterionic, nonionic and anionic surfactants, ionic liquids and phase transfer catalysts.

9. The process of claim 8 wherein said co-catalyst is a tetraalkylammonium salt, esterquat or lecithin which is present as a component of the crude polyunsaturated fatty acid esters and glyceride starting material mixture.

10. The process of claim 8 wherein said cationic surfactant comprises octyltrimethylammonium chloride (OTAC), dodecyltrimethylammonium chloride (DTAC), tetradecyltrimethylammonium chloride, cetyltrimethylammonium chloride (CTAC), cetylpyridinium chloride, octadecyltrimethylammonium chloride, distearyldimethylammonium chloride, dicocoylmethylethoxymonium methosulfate or distearoylmethylethoxymonium methosulfate.

11. The process of claim 8 wherein the molar ratio between co-catalyst and hydrophilic ligand is about 1:2 to about 1:20.

12. The process of claim 1 wherein said aqueous/organic two-phase system is formed by the aqueous catalyst solution and the polyunsaturated fatty acid alkyl ester or glyceride.

13. The process of claim 12 wherein the ratio between the volume of the aqueous and the organic phase is about 7:1 to about 1:5.

14. The process of claim 12 wherein the pH value of the aqueous phase is adjusted to about 7.

15. The process of claim 12 wherein the organic phase comprises an organic solvent.

16. The process of claim 15 wherein said solvent is selected from the group consisting of diethyl ether, pentane, hexane, toluene and mixtures thereof.

17. The process of claim 1 wherein the hydrogenation is conducted at a temperature of about 50° C. to about 120° C.

18. The process of claim 1 wherein the hydrogenation is conducted under a pressure of about 5 bar to about 100 bar.

19. The process of claim 1 wherein the hydrogenation is conducted over a reaction time of about 5 to about 240 minutes.

20. The process of claim 1 further comprising the steps of separating the phases, purifying the hydrogenation product, and recycling the aqueous phase comprising the catalyst.

21. A method of homogeneous hydrogenation comprising hydrogenating polyunsaturated fatty acid alkyl esters or glycerides in the presence of a catalyst consisting of a metal selected from the group consisting of rhodium, ruthenium, palladium, and mixtures thereof, and trisulfonated triphenylphosphine as a hydrophilic ligand to produce a C18:1-containing unsaturated fatty acid alkyl ester or glyceride, wherein the fraction containing the C18:1 unsaturated fatty acid alkyl ester or glyceride is composed of 50 mol % or more cis-C18:1 components.

22. A process for the manufacture of C18:1-containing unsaturated fatty acid alkyl esters or glycerides, the process comprising:
partially hydrogenating polyunsaturated fatty acid esters or glycerides comprising at least 65 mole-% of C18:2 and C18:3, based on the total C18 content, in a two-phase aqueous/organic system, in the presence of a water-soluble catalyst consisting of a metal selected from the group consisting of rhodium, ruthenium, palladium, and mixtures thereof, and trisulfonated triphenylphosphine (TPPTS) as a hydrophilic ligand, wherein the resulting partial hydrogenation product comprises about 30 to about 80 mole-% of C18:1-containing unsaturated fatty acid alkyl esters or glycerides,
and wherein the total content of C18:1 unsaturated fatty acid alkyl ester or glyceride is composed of 50 mol % or more cis-C18:1 components versus trans-C18:1 components.

* * * * *

UNITED STATES PATENT AND TRADEMARK OFFICE
CERTIFICATE OF CORRECTION

| | | |
|---|---|---|
| PATENT NO. | : 8,263,794 B2 | Page 1 of 1 |
| APPLICATION NO. | : 12/444989 | |
| DATED | : September 11, 2012 | |
| INVENTOR(S) | : Papadogianakis et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 402 days.

Signed and Sealed this
Eighth Day of January, 2013

David J. Kappos
*Director of the United States Patent and Trademark Office*